United States Patent
Chikusa et al.

(10) Patent No.: US 7,558,916 B2
(45) Date of Patent: Jul. 7, 2009

(54) STORAGE SYSTEM, DATA PROCESSING METHOD AND STORAGE APPARATUS

(75) Inventors: Takashi Chikusa, Odawara (JP); Satoru Yamaura, Odawara (JP); Hiroyuki Kumasawa, Odawara (JP); Hironori Nakama, Odawara (JP); Masashi Yukawa, Odawara (JP)

(73) Assignee: Hitachi, Ltd., Tokyo (JP)

( * ) Notice: Subject to any disclaimer, the term of this patent is extended or adjusted under 35 U.S.C. 154(b) by 337 days.

(21) Appl. No.: 11/376,060

(22) Filed: Mar. 16, 2006

(65) Prior Publication Data

US 2007/0180168 A1    Aug. 2, 2007

(30) Foreign Application Priority Data

Feb. 1, 2006    (JP) .............................. 2006-024391

(51) Int. Cl.
*G06F 12/00* (2006.01)
*G06F 13/00* (2006.01)
*G06F 13/28* (2006.01)

(52) U.S. Cl. .................. 711/114; 711/111; 711/112; 711/151; 711/154; 714/6

(58) Field of Classification Search .................. 711/114
See application file for complete search history.

(56) References Cited

U.S. PATENT DOCUMENTS

| 5,872,906 | A  | * | 2/1999  | Morita et al. ................... 714/6  |
| 6,571,354 | B1 | * | 5/2003  | Parks et al. ..................... 714/7  |
| 6,647,514 | B1 | * | 11/2003 | Umberger et al. ............. 714/42 |
| 7,292,897 | B2 | * | 11/2007 | Miura et al. .................... 700/3 |
| 2003/0140051 | A1 |  | 7/2003 | Fujiwara et al. |
| 2005/0210098 | A1 |  | 9/2005 | Nakamichi et al. |
| 2007/0067666 | A1 | * | 3/2007 | Ishikawa et al. ............... 714/6 |

FOREIGN PATENT DOCUMENTS

| JP | 2003-216474 | 1/2002 |
| JP | 2005-266933 | 7/2004 |

* cited by examiner

*Primary Examiner*—Kevin L Ellis
*Assistant Examiner*—Prasith Thammavong
(74) *Attorney, Agent, or Firm*—Reed Smith LLP; Juan Carlos A. Marquez, Esq.

(57) ABSTRACT

Proposed are a storage system, data processing method and storage apparatus capable of performing stable data I/O processing. Each of the storage apparatuses configured in the storage group stores group configuration information containing priority information given to each storage apparatus, and the storage apparatus with the highest priority becomes a master and performs virtualization processing and data I/O processing, and another storage apparatus belonging to this storage group performs internal processing of the storage group.

22 Claims, 26 Drawing Sheets

| | | 83A | 83B | |
|---|---|---|---|---|
| 82A | MASTER OPERATIONAL CONFIGURATION INFORMATION | MODE | PARAMETER | .... |
| 82B | SUBMASTER OPERATIONAL CONFIGURATION INFORMATION | MODE | PARAMETER | .... |
| 82C | SLAVE OPERATIONAL CONFIGURATION INFORMATION | MODE | PARAMETER | .... |

| ① | ② | ③ | ④ | ⑤ |
|---|---|---|---|---|
| A | A | | | |

(A-2)

| METADATA | QUANTITY OF DISTRIBUTION (nD) |
|---|---|
| ②:A | 1 |

(B-1)

| ① | ② | ③ | ④ | ⑤ |
|---|---|---|---|---|
| P(A,B) | A | B | | |

(B-2)

| METADATA | QUANTITY OF DISTRIBUTION (nD) |
|---|---|
| ②:A, ③:B | 2 |

(C-1)

| ① | ② | ③ | ④ | ⑤ |
|---|---|---|---|---|
| P(A,B) | A | B | B' | |

(C-2)

| METADATA | QUANTITY OF DISTRIBUTION (nD) |
|---|---|
| ②:A, ③:B | 2 |

(D-1)

| ① | ② | ③ | ④ | ⑤ |
|---|---|---|---|---|
| P(A,B') | A | B | B' | |

(D-2)

| METADATA | QUANTITY OF DISTRIBUTION (nD) |
|---|---|
| ②:A, ④:B' | 2 |

(E-1)

| ①(PARITY) | ② | ③ | ④ | ⑤ |
|---|---|---|---|---|
| P(A-D) | A | B | C | D |
| P(E) | E | | | |

(E-2)

| METADATA | QUANTITY OF DISTRIBUTION (nD) |
|---|---|
| ②:A···⑤:D | 4 |
| ②:E | 1 |

| ①(PARITY) | ② | ③ | ④ | ⑤ | ⑥(NEW EXPANSION) |
|---|---|---|---|---|---|
| P(A-D,F) | A | B | C | D | F |
| P(E) | E | | | | |

(B)

| METADATA DISTRIBUTION | QUANTITY OF DISTRIBUTION (nD) |
|---|---|
| ②:A···⑥:F | 5 |
| ②:E | 1 |

| ①(PARITY) | ② | ③ | ④ | ⑤ |
|---|---|---|---|---|
| A | A | | | |
| B | | B | | |
| C | | | C | |
| D | | | | D |
| E | E | | | |
| F | | F | | |
| G | | | G | |
| H | | | | H |

(A-2)

| METADATA | QUANTITY OF DISTRIBUTION (nD) |
|---|---|
| ②:A | 1 |
| ③:B | 1 |
| ④:C | 1 |
| ⑤:D | 1 |
| ②:E | 1 |
| ③:F | 1 |
| ④:G | 1 |
| ⑤:H | 1 |

NUMBER OF APPARATUSES THAT MUST BE READ IN A SINGLE APPARATUS FAILURE:1

(B-1)

| ①(PARITY) | ② | ③ | ④ | ⑤ |
|---|---|---|---|---|
| P(A, I) | A | I | | |
| P(B, J) | | B | J | |
| P(C, K) | | | C | K |
| P(D, L) | L | | | D |
| E | E | | | |
| F | | F | | |
| G | | | G | |
| H | | | | H |

(B-2)

| METADATA | QUANTITY OF DISTRIBUTION (nD) |
|---|---|
| ②:A, ③:I | 2 |
| ③:B, ④:J | 2 |
| ④:C, ⑤:K | 2 |
| ⑤:D, ②:L | 2 |
| ②:E | 1 |
| ③:F | 1 |
| ④:G | 1 |
| ⑤:H | 1 |

NUMBER OF APPARATUSES THAT MUST BE READ IN A SINGLE APPARATUS FAILURE:2

NUMBER OF APPARATUSES THAT MUST BE READ IN A SINGLE APPARATUS FAILURE:1

STORAGE SYSTEM, DATA PROCESSING METHOD AND STORAGE APPARATUS

CROSS-REFERENCES TO RELATED APPLICATIONS

This application relates to and claims priority from Japanese Patent Application No. 2006-024391, filed on Feb. 1, 2006, the entire disclosure of which is incorporated herein by reference.

BACKGROUND

The present invention relates to a storage system, data processing method and storage apparatus, and, for instance, is suitably applied to a storage system having a plurality of storage apparatuses.

Recently, in the field of storages, virtualization technology of presenting a plurality of storage apparatuses as a single storage apparatus to a host system is being researched and proposed. According to this virtualization technology, the overall system will not be affected even though a new storage apparatus is added, and management costs of the storage system can be reduced thereby.

As one kind of such virtualization technology, conventionally, a system of storing a single file by distributing it to a plurality of storage apparatuses is being proposed. With this system, a file is divided per fixed length, and is sequentially stored in each storage apparatus according to a round robin method. Further, with this system, there is a management server that manages in what order the files are to be distributed and stored in which storage apparatus, and the host system inquires the storage position of the files to this management server when accessing the target file.

Incidentally, as virtualization technology of storage apparatuses, in addition to the foregoing system, Japanese Patent Laid-Open Publication No. 2003-216474 discloses virtualization technology for improving the extensibility of the storage apparatus without requiring a management server, and Japanese Patent Laid-Open Publication No. 2005-266933 discloses virtualization technology for virtualizing and managing a plurality of storage apparatuses distributed over a network.

SUMMARY

Meanwhile, with the foregoing storage system that virtualizes and manages a plurality of storage apparatuses distributed over a network, a virtualization device for performing virtualization processing performs both data I/O processing in response to a data I/O request from a host system, and internal processing such as data migration processing among the virtualized storage apparatuses, and there is a problem in that the burden on the virtualization device is significant.

Thus, with the foregoing conventional storage system, for instance, during the performance of high-load internal processing such as volume copy for copying all data of a single volume, it is not possible to promptly respond to a data I/O request from the host system, and this could lead to a delay in the data I/O processing.

The present invention was devised in view of the foregoing problems, and an object thereof is to provide a storage system, data processing method and storage apparatus capable of performing stable data I/O processing.

In order to achieve the foregoing object, the present invention provides a storage system in which a plurality of storage apparatuses are connected to a network, wherein the storage apparatus retains an identifier for identifying a storage group to which a preconfigured own storage apparatus belongs; and retains configuration information of each of the storage apparatuses, priority information representing the priority of the storage apparatus in the storage group and management information of the overall storage group which are common among all of the storage apparatuses configured in the same storage group; and wherein one or more first storage apparatuses of a master for performing virtualization processing of the storage apparatus in the storage group units and data I/O processing from a host system, and one or more second storage apparatuses for performing data migration involving internal processing are configured.

As a result, with this storage system, a particular storage apparatus in the storage group will perform the virtualization processing and data I/O processing, and another storage apparatus will perform the internal processing. Thus, it is possible to avoid the load from concentrating on the storage apparatus performing the virtualization processing. For example, even during the execution of high-load internal processing in the storage group, it is possible to reply promptly to the data I/O request from the host system.

Further, the present invention also provides a data processing method of a storage system in which a plurality of storage apparatuses are connected to a network, wherein each of the storage apparatuses includes: a first step where each of the storage apparatuses stores management information per storage apparatus of each of the storage apparatuses configured in the same storage group, and group configuration information formed from management information relating to the overall storage group; and a second step where the corresponding storage apparatus executes necessary processing based on the group configuration information; wherein the group configuration information contains priority information representing the priority of each of the storage apparatuses in the storage group given to each of the storage apparatuses belonging to the storage group; and wherein, at the second step, virtualization processing where a first storage apparatus with the highest priority in the storage group recognized based on the group configuration information becomes a master and virtualizes a storage area to be provided respectively by each of the storage apparatuses, and data I/O processing in reply to a data I/O request from a host system to the virtualized storage area are performed; and another storage apparatus belonging to the storage performs the internal processing of the storage group.

As a result, with this storage system, a particular storage apparatus in the storage group will perform the virtualization processing and data I/O processing, and another storage apparatus will perform the internal processing. Thus, it is possible to avoid the load from concentrating on the storage apparatus performing the virtualization processing. For example, even during the execution of high-load internal processing in the storage group, it is possible to reply promptly to the data I/O request from the host system.

Moreover, the present invention also provides a storage apparatus for providing a storage area for storing data, including: a storage unit for storing management information per storage apparatus of each of the storage apparatuses configured in the same storage group, and group configuration information formed from management information relating to the overall storage group; and a processing execution unit for executing necessary processing based on the group configuration information; wherein the group configuration information contains priority information representing the priority of each of the storage apparatuses in the storage group given to each of the storage apparatuses belonging to the storage group; and wherein the processing execution unit performs virtualization processing for virtualizing each of the storage apparatuses belonging to the storage group when the priority of the own storage apparatus in the storage group recognized based on the group configuration information is the highest, and data I/O processing in reply to a data I/O request from a host system to each of the virtualized storage apparatuses; and performs internal processing of the storage group when the priority of the own storage apparatus is the next highest priority.

As a result, with this storage system, a particular storage apparatus in the storage group will perform the virtualization processing and data I/O processing, and another storage apparatus will perform the internal processing. Thus, it is possible to avoid the load from concentrating on the storage apparatus performing the virtualization processing. For example, even during the execution of high-load internal processing in the storage group, it is possible to reply promptly to the data I/O request from the host system.

According to the present invention, it is possible to realize a storage system, data processing method and storage apparatus capable of performing stable data I/O processing.

DESCRIPTION OF DRAWINGS

FIG. 22 is a block diagram for explaining the backup method in the storage system according to the second embodiment;

FIG. 23 is a block diagram for explaining the backup method in the storage system according to the second embodiment;

FIG. 24 is a block diagram for explaining the backup method in the storage system according to the second embodiment;

DETAILED DESCRIPTION

An embodiment of the present invention is now explained in detail with reference to the drawings.

Figure 1:
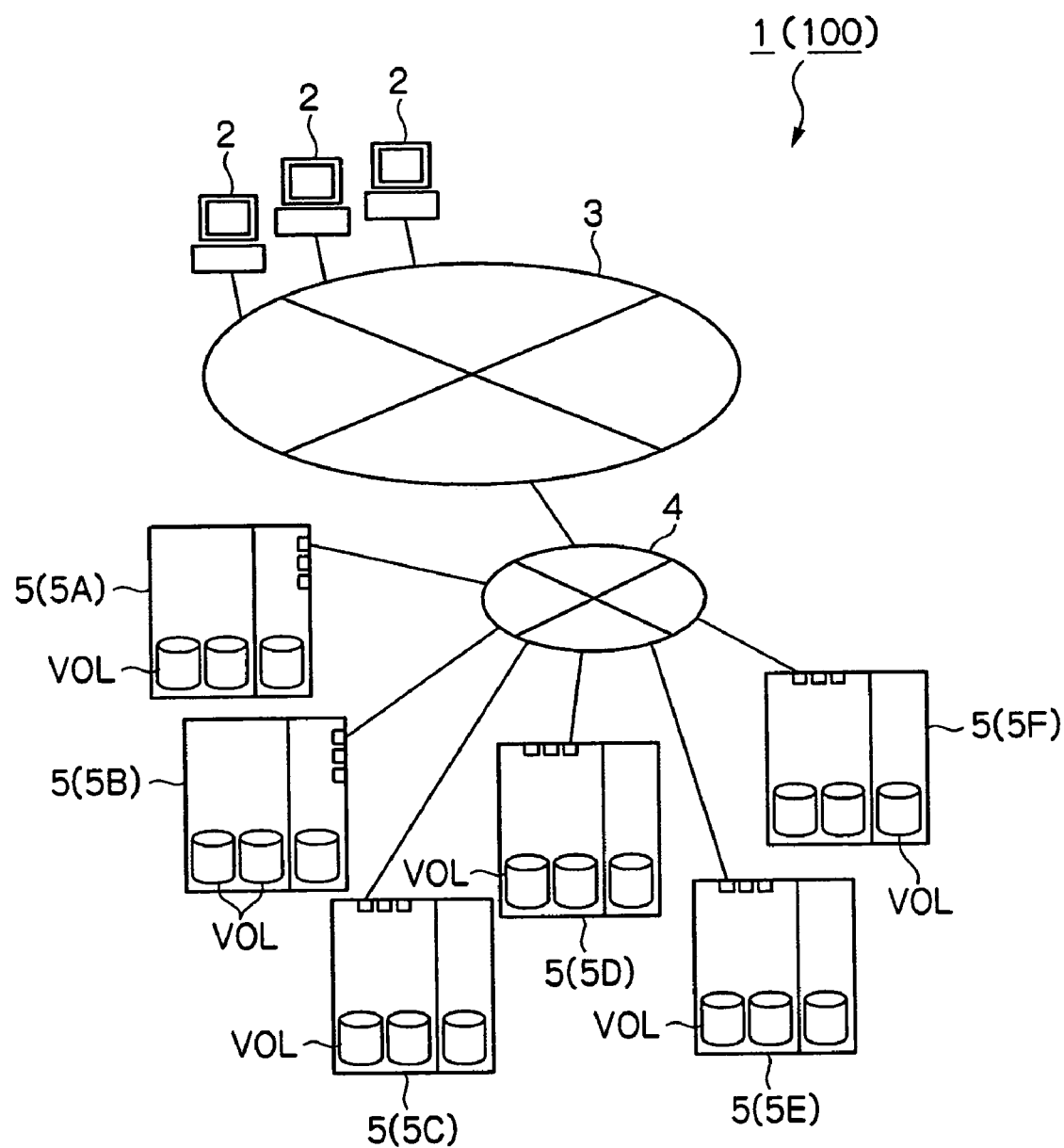
FIG. 1 is a block diagram showing the configuration of a storage system according to the present embodiment.

(1) FIRST EMBODIMENT (1-1) Configuration of Network System in Present Embodiment FIG. 1 shows a network system 1 pertaining to this embodiment. This network system 1 is configured by one or more host systems 2 being connected in parallel to a plurality of storage apparatuses 5 (5A to 5F) via first and second networks 3, 4.

The host system 2 is a computer device having information processing resources such as a CPU (Central Processing Unit) and memory, and, for instance, is configured from a personal computer, workstation, mainframe computer or the like. The host system 2 has an information input device (not shown) such as a keyboard, switch or pointing device or microphone, and an information output device (not shown) such as a monitor display or speaker.

The first and second networks 3, 4 are configured, for example, from a SAN (Storage Area Network), LAN (Local Area Network), Internet, public line or dedicated line. Communication between the host system 2 and storage apparatus 5 via the first and second networks 3, 4 is conducted according to a fibre channel protocol when the first and second networks 3, 4 are a SAN, and conducted according to a TCP/IP (Transmission Control Protocol/Internet Protocol) protocol when the first and second networks 3, 4 are a LAN.

Figure 2:
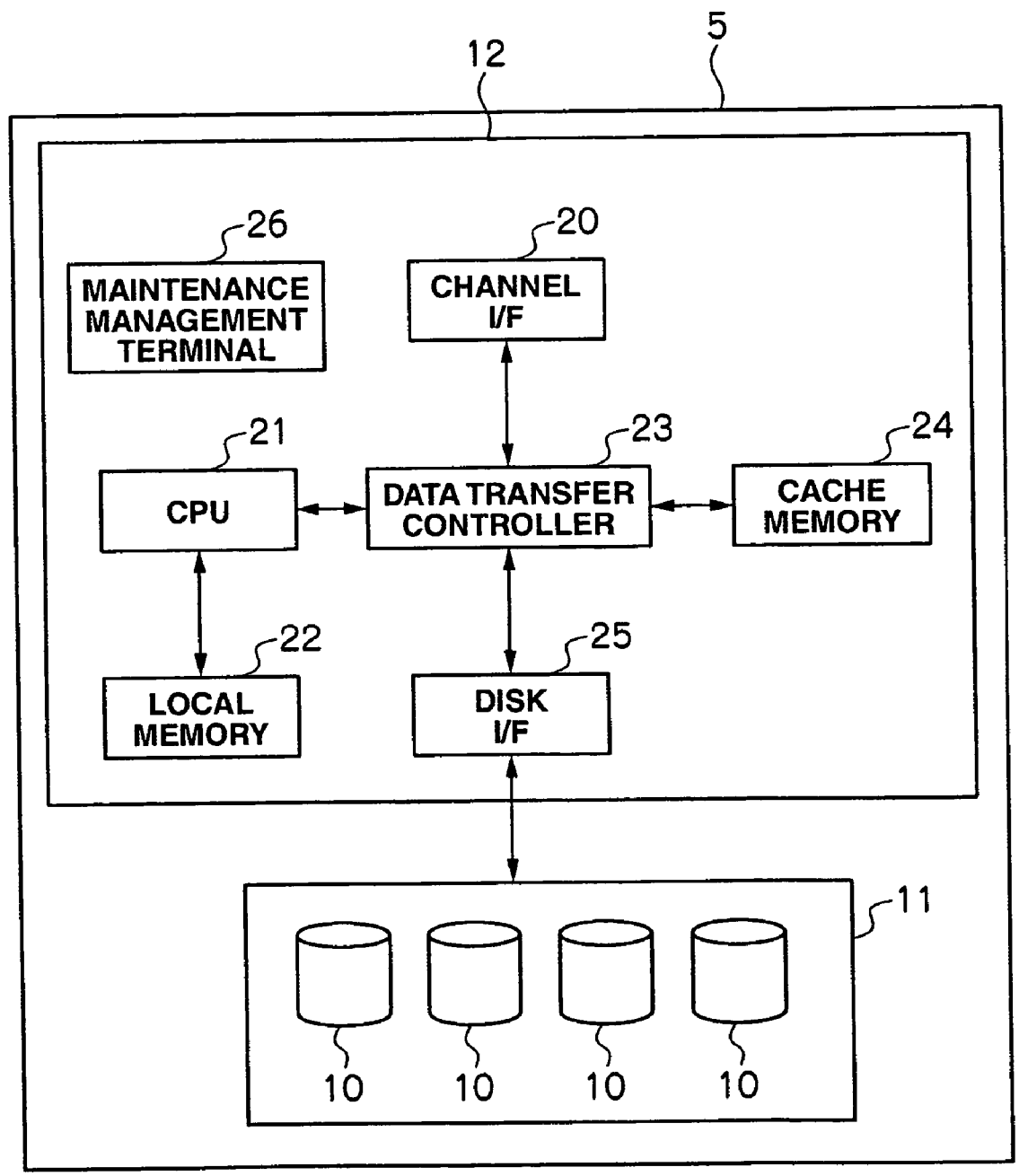
FIG. 2 is a block diagram showing the configuration of a storage apparatus.

The storage apparatus 5, as shown in FIG. 2, has a disk device group 11 configured from disk devices 10 such as a plurality of hard disk drives, and a controller 12 for controlling the respective disk devices 10 configuring the disk device group 11.

As the disk devices 10 configuring the disk device group 11, for example, expensive disks such as SCSI (Small Computer System Interface) disks, or inexpensive disks such as SATA (Serial AT Attachment) disks or optical disks may be used.

Each disk device 10 is operated by the control unit (controller) 12 according to the RAID (Redundant Array of Inexpensive Disks) system. One or more disk devices 10 configure a single RAID group, and one or more logical volumes are respectively configured on a physical storage area provided by each RAID group. And data is stored in block (this is hereinafter referred to as a "logical block") units of a prescribed size in this volume.

A unique identifier (this is hereinafter referred to as a "LUN (Logical Unit Number)) is given to each logical volume. In the case of this embodiment, the input and output of data is conducted upon designating an address, which is a combination of this LUN and a number unique to a logical block (LBA: Logical Block Address) given to each logical block.

The controller 12 is configured by including a channel interface 20, a CPU 21, a local memory 22, a data transfer controller 23, a cache memory 24, a disk interface 25, a maintenance management terminal 26 and so on.

The channel interface 20 is an interface to the second network 4, and transmits and receives data to be written, data read from the disk device 10 and various commands to and from the host system 2.

The CPU 21 is a processor for controlling the various processes such as the data I/O processing to the disk device 10 in reply to a data I/O request (e.g., data write request or data read request) from the host system 2. The local memory 22 is used as the work memory of the CPU 21.

The data transfer controller 23 controls the data transfer between the channel interface 20 and disk interface 25 based on the CPU 21's control.

The cache memory 24 is used for temporarily storing data to be transferred between the channel interface 20 and disk interface 25. This cache memory 24 stores system information and various control programs read from the disk device 10 upon the activation of the storage apparatus 5. The CPU 21 is able to execute the foregoing data I/O processing and various processes described later by reading and executing these control programs from the cache memory 24 as necessary.

The disk interface 25 is an interface to the disk device 10, and transmits and receives data to be written, data read from the disk device 10 and various commands to and from the disk device 10, for instance, according to a fibre channel protocol.

The maintenance management terminal 26 is a terminal device for maintaining and managing the storage apparatus 5, and, for example is configured from a laptop personal computer. The maintenance management terminal 26 monitors the status of failure in the storage apparatus 5, and notifies the administrator when a failure has occurred by displaying such fact on the screen. The operator is able to configure the system configuration information of the storage apparatus 5 or create a storage group described later by using this maintenance management terminal 26.

(1-2) Storage Group SG in Storage System 1

Next, the storage group SG adopted in the storage system 1 is explained.

(1-2-1) Description of Storage Group

Figure 3:
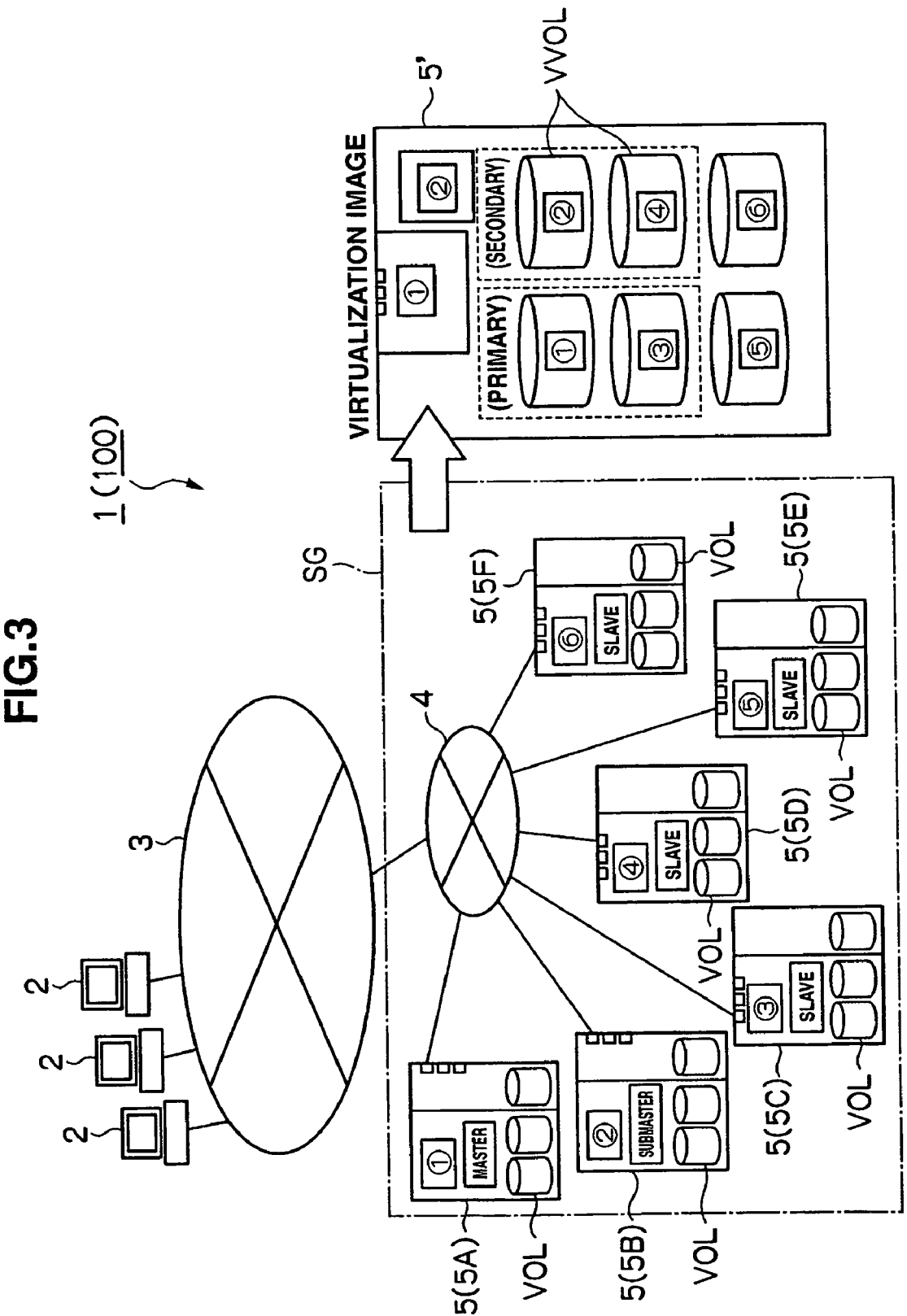
FIG. 3 is a block diagram for explaining a storage group.

With the storage system 1 according to this embodiment, as shown in FIG. 3, a single group (this is hereinafter referred to as a "storage group") SG is configured from a single storage apparatus (hereinafter arbitrarily referred to as a "master storage apparatus") 5 that functions as a master, and a plurality of storage apparatuses (hereinafter arbitrarily referred to as "slave storage apparatuses") 5 that function as a slave and which are connected in parallel to the second network 4, and the master storage apparatus 5 performs the data I/O processing in reply to the data I/O request from the host system 2 and the virtualization processing in the storage group SG, and the slave storage apparatuses 5 perform the internal processing in the storage group SG. As a result, with this storage system 1, the data I/O processing and virtualization processing, and the internal processing are separately performed by different storage apparatuses 5, and, for instance, it is possible to practically and sufficiently prevent the data I/O processing from being influenced by the execution of high-load internal processing such as for creating a replication volume.

In actuality, with this storage system 1, the administrator is able to display a storage group configuration screen 30 described later with reference to FIG. 4 on the maintenance management terminal 26 of a target storage apparatus 5, use this storage group configuration screen 30 to select a plurality of storage apparatuses configuring the storage group SG, and configure one storage apparatus 5 among the above to become the master. This master storage apparatus 5 will subsequently handle the data I/O processing and the virtualization processing of the storage group SG. Then, the storage apparatuses other than the master storage apparatus 5 in the storage group SG will become slaves. Incidentally, the storage system 1 may also be configured so that a plurality of master storage apparatuses 5 can be configured. Nevertheless, in the following description, a case is explained taking an example where only one master storage apparatus 5 can be configured.

Each storage apparatus 5 configuring the storage group SG is given a number representing priority (this is hereinafter referred to as a "priority number") to become a substitute master when a failure occurs in the master storage apparatus 5. For example, a priority number of "1" is given to the master storage apparatus 5, and a priority number of "2" is given to the storage apparatus 5 to become the substitute master when a failure occurs in the master storage apparatus 5. The priority numbers may overlap, or be spaced out.

Each storage apparatus 5 retains information such as the priority number and network address of all storage apparatuses 5 including one's own storage apparatus in the same storage group SG. Thereby, all storage apparatuses 5 are able to function as the master at any time.

The slave storage apparatus 5 replies that it is an operable storage apparatus only to a discovery request from a storage apparatus 5 given a priority number that is equal to the own storage apparatus or that is higher than the own storage apparatus, and does not reply to a discovery request issued from the host system 2 or another device. As a result, even if a storage apparatus 5 configuring the storage group SG is disposed in parallel on the second network 4, it is possible to prevent the host system 2 from recognizing a storage apparatus 5 other than the master storage apparatus 5. Further, as described later, there will be no confusion even if a plurality of storage groups SG exist on the same network. Nevertheless, it is possible to link-up to a switch configuring a network, and collect information necessary for the switch route table.

In addition to responding to the various accesses such as a data I/O request from the host system 2, the master storage apparatus 5 is also capable of configuring the storage group SG. Nevertheless, in an initial state when a master storage apparatus 5 does not exist where the storage group SG is not yet configured, an arbitrary storage apparatus 5 can be made to be a provisional "master", and this storage apparatus 5 can be used to construct a storage group SG.

When configuration information (this is hereinafter referred to as "group configuration information") of the storage group SG configured by the administrator is stored in the master storage apparatus 5, the master storage apparatus 5 notifies this group configuration information to all storage apparatuses 5 in the storage group SG. Then, the other storage apparatuses 5 that received this group configuration information store such group configuration information in a freely referable manner. Thereby, for instance, even if the configuration information of the storage group SG stored in the master storage apparatus 5 is lost, it is possible to restore the group configuration information in the master storage apparatus 5 by using the group configuration information stored in the other storage apparatuses in the same storage group SG.

Addition of a new storage apparatus 5 to the storage group SG can be realized simply by additionally registering such storage apparatus 5 to the group configuration information of the storage group SG. When there is no particular designation, the lowest priority number (predetermined maximum value) is tentatively (automatically) allocated to the added storage apparatus 5. Therefore, although the added storage apparatus 5 will be configured as a slave as a matter of course, the addition of a storage apparatus 5 will not have a significant influence on the configuration of the storage group SG. The storage capacity of the added storage apparatus 5 is pooled as the storage capacity in the storage group SG. Incidentally, the priority number given to the added storage apparatus 5 may be changed later.

The storage group SG can be created in a mode according to the intended use. Further, since each storage apparatus 5 retains group configuration information of the storage group SG to which the own storage apparatus belongs, it is also possible to create a plurality of storage groups SG so that one or more storage apparatuses 5 overlap. When a storage apparatus 5 overlappingly belongs to a plurality of storage groups SG, it is possible to give a different priority number per storage group SG to the storage apparatus 5. Nevertheless, the storage apparatus 5 may be configured so that different storage groups SG do not use the same storage area in the storage apparatus 5, or the storage apparatus 5 may be exclusively controlled using a function such as LUN masking or logical partitioning of ports as necessary.

(1-2-2) Details of Storage Group SG

Next, details of the storage group SG are explained. In the following description, an explanation is provided where the slave storage apparatus 5 with the highest priority number belonging to the storage group SG handles the internal processing in the storage group SG. Therefore, below, in order to differentiate the slave storage apparatus 5 and other slave storage apparatuses 5, this is arbitrarily referred to as a sub-master storage apparatus 5. Further, in this embodiment, as shown on the right side of FIG. 3, a backup method is adopted where a virtual volume VVOL per storage apparatus 5 in the storage group SG is created, and this is subject to mirroring in virtual volume VVOL units.

(1-2-2-1) Configuration of Storage Group SG and Management of Group Configuration Information Foremost, the method of creating the storage group SG in the storage system 1 and the method of managing group configuration information of the storage group SG in the storage apparatus 5 are explained.

Figure 4:
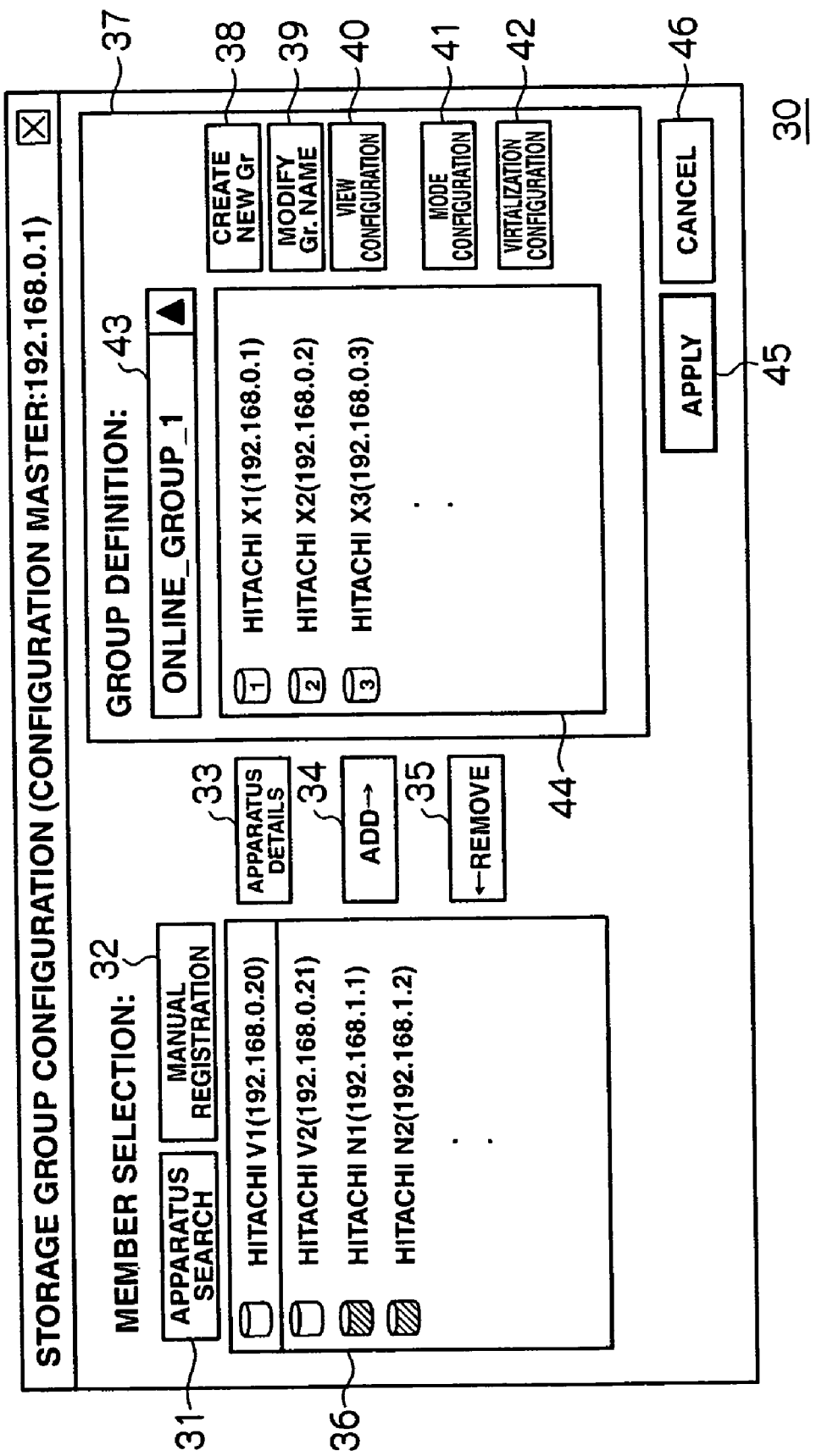
FIG. 4 is a schematic diagram showing a storage group configuration screen.

FIG. 4 shows the foregoing storage group configuration screen 30. As evident from this FIG. 4, the storage group configuration screen 30 is provided with an apparatus search button 31, a manual registration button 32, an apparatus detail button 33, an addition button 34, a remove button 35, a candidate storage list-box 36, and a group definition unit 37.

The apparatus search button 31 is a button for issuing an order for issuing a discovery command to the storage apparatus 5 having the maintenance management terminal 26 displaying the storage group configuration screen 30. Information such as the model name and network address of the respective storage apparatuses 5 that have been responding to the discovery command is displayed as a list in the list-box for candidate storage 36.

Further, the manual registration button 32 is a button for manually inputting information such as the model name of the storage apparatus 5 capable of becoming a constituent element of the storage group SG. By using a prescribed manual configuration screen not shown that is displayed by clicking the manual registration button 32, the administrator is able to register the target storage apparatus 5 as a candidate of a constituent element of the storage group SG. Information such as the model name and network address of the discovered storage apparatus 5 is displayed in the candidate storage list-box 36.

The apparatus detail button 33 is a button for displayed detailed information of the storage apparatus 5 entered in the candidate storage list-box 36. By clicking this apparatus detail button 33 after designating a target storage apparatus 5 among the respective storage apparatuses entered in the candidate storage list-box 36, it is possible to display detailed information of the storage apparatus 5 obtained based on the reply to the foregoing discovery command.

The addition button 34 is a button for selecting a target storage apparatus 5 as a constituent element of the target storage group SG. By clicking the addition button 34 after designating a target storage apparatus 5 among the respective storage apparatuses 5 entered in the candidate storage list-box 36, the administrator is able to select such storage apparatus 5 as the constituent element of the storage group SG. Here, information of the storage apparatus that was displayed on the candidate storage list-box 36 is moved and displayed on the group configuration storage list-box 44 of the group definition unit 37 described later.

Further, the remove button 35 is a button for removing a target storage apparatus 5 from the constituent element of the target storage group SG. By clicking the remove button 35 after designating a target storage apparatus 5 among the respective storage apparatuses 5 entered in the group configuration storage list-box 44, the administrator is able to remove such storage apparatus 5 from the constituent element of the storage group SG. Here, information of the storage apparatus 5 that was displayed on the group configuration storage list-box 44 is moved and displayed on the candidate storage list-box 36.

Meanwhile, the group definition unit 37 is configured from a new group creation button 38, a group name modify button 39, a configuration detail view button 40, a mode configuration button 41, a virtualization configuration button 42, a group name list-box 43, and a group configuration storage list-box 44.

The new group creation button 38 is a button for creating a new storage group SG and the group configuration storage list-box 44 can be cleared by clicking this new group creation button 38.

Further, the group name modify button 39 is a button for updating the name of the target storage group SG. By clicking this group name modify button 39 after changing the group name of the storage group SG displayed on the group name list-box 43 with a keyboard or the like, it is possible to change the group name of the storage group SG to the name displayed on the group name list-box 43.

Figure 5:
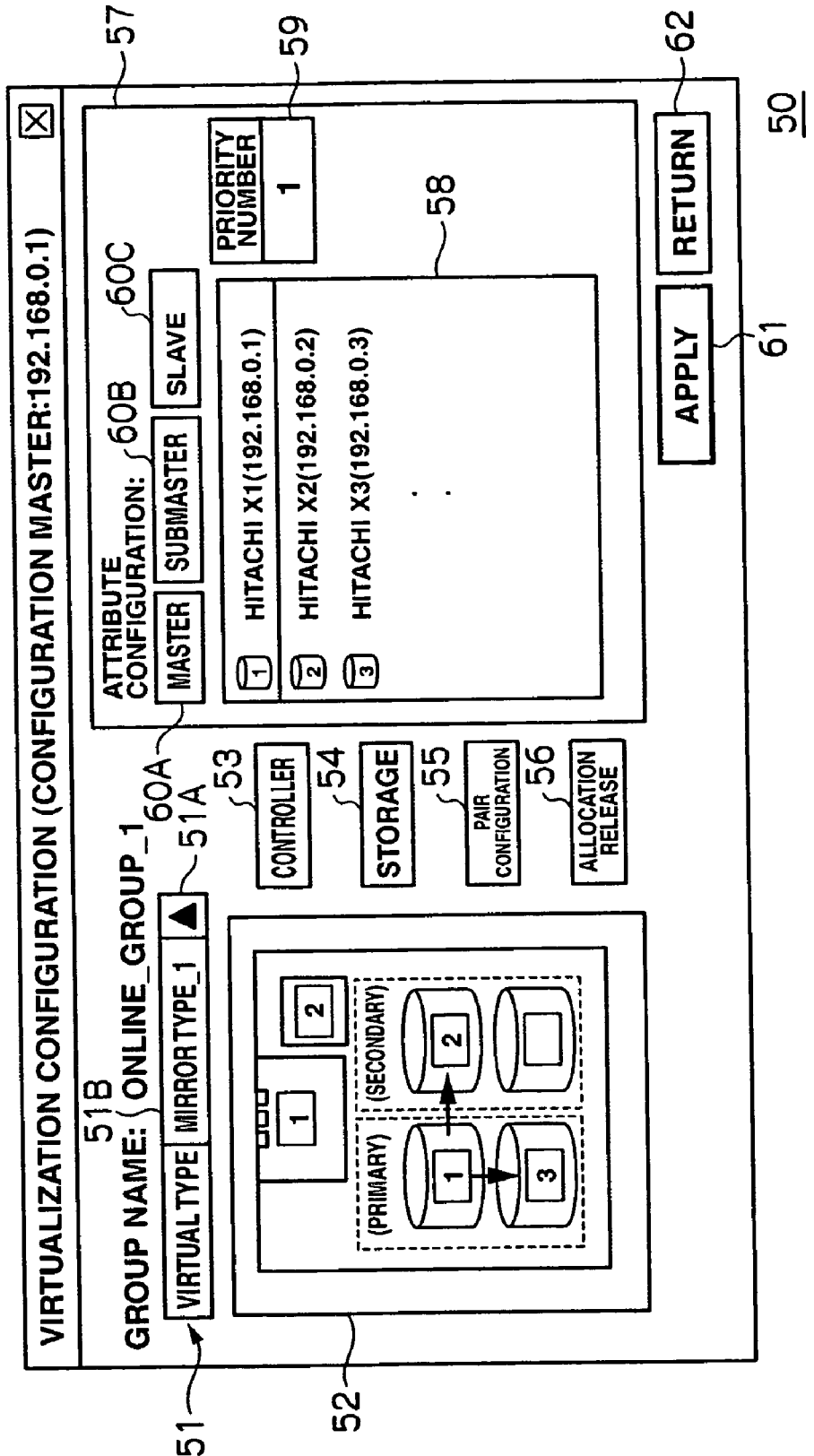
FIG. 5 is a schematic diagram showing a virtualization configuration screen.

The configuration detail view button 40 and virtualization configuration button 42 are both buttons for displaying the virtualization configuration screen 50 shown in FIG. 5. Nevertheless, when the configuration detail view button 40 is clicked, the virtualization configuration screen 50 is displayed in an unmodifiable state, and, when the virtualization configuration button 42 is clicked, the virtualization configuration screen 50 is displayed in a modifiable state.

The group name list-box 43 is a list-box for displaying the group name of the target storage group SG. In the case of this storage system 1, when a new storage group SG is created, a unique group name is automatically allocated to the storage system 1, and this group name is displayed in the group name list-box 43. Nevertheless, this group name can be changed later as described above.

The group configuration storage list-box 44 is a list for displaying prescribed information of each storage apparatus 5 selected as a constituent element of the target storage group SG. As described above, information such as the model name and network address of the storage apparatus 5 selected among the storage apparatuses 5 entered in the candidate storage list-box 36 is displayed in the group configuration storage list-box 44.

Meanwhile, the registration button 45 displayed at the lower right of the storage group configuration screen 30 is a button for actually creating the storage group SG having a configuration configured using the storage group configuration screen 30. By clicking this apply button 45, it is possible to store configuration information of the storage group SG configured using the storage group configuration screen 30, or detailed configuration information of each storage apparatus 5 obtained based on the reply from each storage apparatus 5 to the foregoing discovery command in the storage apparatus 5 as group configuration information.

And, the storage apparatus 5 storing this group configuration information transmits this group configuration information to all storage apparatuses 5 selected as a constituent element of the storage group SG. Further, the storage apparatuses 5 that received this group configuration information respectively store such group configuration information in a freely referable manner. As a result, the respective storage apparatuses 5 configuring the storage group SG will store the same group configuration information, and will therefore be able to respectively recognize the priority number of the own storage apparatus in the storage group SG and the configuration of other storage apparatuses 5 based on this group configuration information.

Incidentally, the cancel button 46 displayed at the lower right of the storage group configuration screen 30 is a button for abandoning the contents displayed on this storage group configuration screen 30, and, by clicking this cancel button 46, it is possible to close the storage group configuration screen 30 without having to create a storage group SG of a configuration displayed on this storage group configuration screen 30.

FIG. 5 shows the virtualization configuration screen 50 for configuring how to present the target storage group SG to the host system 2. This virtualization configuration screen 50, as evident from FIG. 5, is provided with a virtualized storage type configuration unit 51, a virtualization modeling display unit 52, a controller parts allocation button 53, a storage parts allocation button 54, a pair configuration button 55, an allocation release button 56, and an attribute configuration unit 57.

The virtualized storage type configuration unit 51 is a unit for configuring the virtualized storage type of the target storage group SG. The administrator is able to select a predetermined storage virtualization model (mirror type or N+1 type described later) from the pulldown menu not shown displayed when the pulldown button 51A of this virtualized storage type configuration unit 51 is clicked. Then, the selected virtualized storage type is displayed in the virtualized storage type name list-box 51B.

The virtualization modeling display unit 52 is a display unit for displaying animation representing an illustrated model so that it will be easier for the administrator to understand the configuration regarding the migration of backup data in the virtualized storage type configured regarding the storage group SG.

The controller parts allocation 53 and storage parts allocation button 54 are buttons for configuring, as a controller or a storage in the respectively virtualized storage apparatuses, a target storage apparatus 5 among the respective storage apparatuses 5 selected as constituent elements of the target storage group SG entered in the group configuration storage list-box 58 of the attribute configuration unit 57 described later.

Further, the pair configuration button 55 is a button for configuring in a pair the target storage apparatuses 5 among the storage apparatuses 5 entered in the group configuration storage list-box 58. Moreover, the allocation release button 56 is a button for releasing the configurations made through operations of the foregoing controller parts allocation 53, storage parts allocation button 54 or pair configuration button 55.

Meanwhile, the attribute configuration unit 57 has a group configuration storage list-box 58 and a priority number edit-box 59. Among the above, the group configuration storage list-box 58 displays prescribed information of the respective storage apparatuses 5 selected as constituent elements of the target storage group SG as described above.

In addition, provided at the upper part of the group configuration storage list-box 58 are, respectively, a master configuration button 60A, a submaster configuration button 60B and a slave configuration button 60C. By clicking one among the master configuration button 60A, submaster configuration button 60B and slave configuration button 60C after designating one target storage apparatus 5 among the storage apparatuses entered in the group configuration storage list-box 58, it is possible to configure that storage apparatus 5 as a master, submaster or slave. Thereby, the administrator will be able to configure a plurality of master or submaster storage apparatuses 5.

Further, a priority number in the target storage SG given to the storage apparatus 5 designated at such time among the storage apparatuses 5 entered in the group configuration storage list-box 58 is displayed in the priority number list-box 59. In the case of this storage system 1, since a priority number is given to the storage apparatus 5 in the order that it is entered in the group configuration storage list-box 44 (FIG. 4) of the storage group configuration screen 30 (FIG. 4), this priority number is displayed in the priority number list-box 59. Nevertheless, the priority number displayed in this priority number list-box 59 can be rewritten with a keyboard or the like, and the priority number of the storage apparatus 5 can be changed thereby.

The apply button 61 and return button 62 displayed at the lower right of the virtualization configuration screen 50 have the same functions as the apply button 45 (FIG. 4) and cancel button 46 (FIG. 4) of the storage group configuration screen 30 (FIG. 4), and the explanation thereof is omitted.

Figure 6:
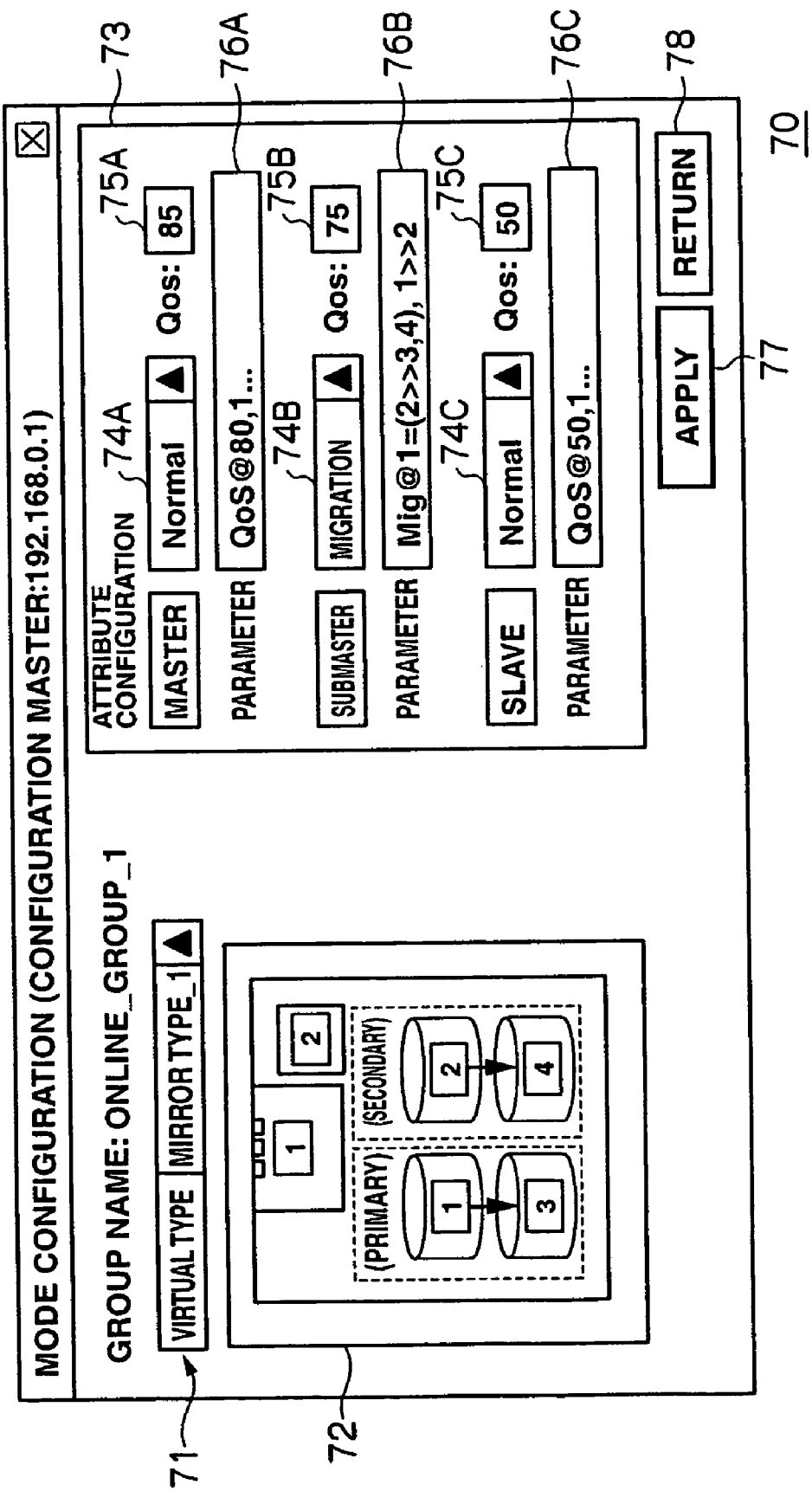
FIG. 6 is a schematic diagram showing a mode configuration screen.

FIG. 6 shows a mode configuration screen 70 for configuring the detailed contents of the operational mode of the master, submaster and slave. The mode configuration screen 70, as evident from FIG. 6, is provided with a virtualized storage type display/switching unit 71, a virtualization status display unit 72 and an attribute configuration unit 73. Among the above, the virtualized storage type display/switching unit 71 has the same function as the virtualized storage type configuration unit 51 (FIG. 5) of the virtualization configuration screen 50 (FIG. 5), and the explanation thereof is omitted. Data stored in which volume is to be backed up in which volume is displayed in the virtualization status display unit 72 with an illustrated model diagram.

The attribute configuration unit 73 is provided with type configuration units 74A, 74B, 74C for configuring the respective function types or qualities (performances) of the master, submaster and slave; bandwidth configuration columns 75A, 75B, 75C for displaying the bandwidth usage ratio configured regarding the master, submaster or slave; and parameter configuration columns 76A, 76B, 76C capable of configuring more detailed parameters (for instance, configuration of various parameters of QoS (Quality of Service)) regarding the configuration items configured regarding the master, submaster or slave.

The apply button 77 and return button 78 displayed at the lower right of the mode configuration screen 70 have the same functions of the apply button 45 and return button 46 of the storage group configuration screen 30 (FIG. 4), and the explanation thereof is omitted.

Figure 7:
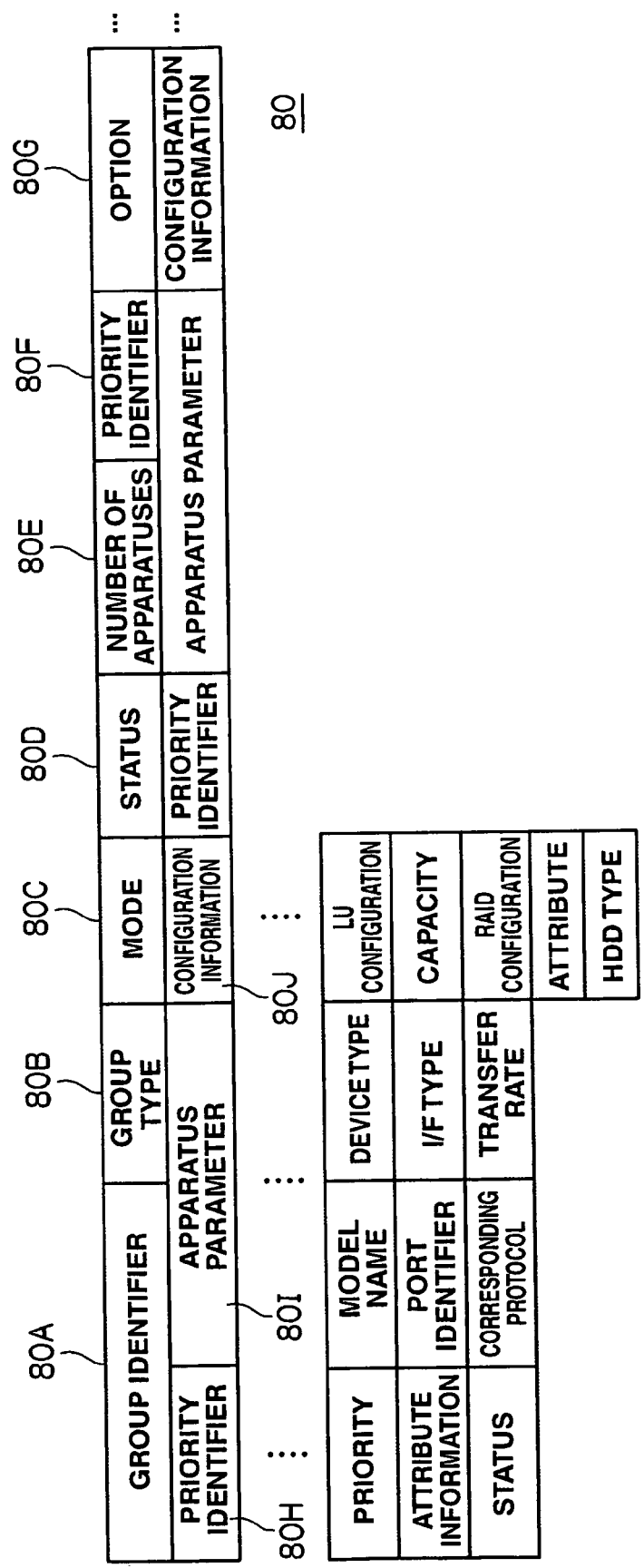
FIG. 7 is a conceptual diagram showing a group configuration information table.

Meanwhile, FIG. 7 shows the group configuration information table 80 retained by the respective storage apparatuses 5 configured as constituent elements of the storage group SG. Each storage apparatus 5 retains, in the form of this kind of table, configuration information of the storage group SG and detailed configuration information of the respective storage apparatuses 5 configuring the storage group SG which are configured by the administrator using the foregoing storage group configuration screen 30 (FIG. 4) and virtualization configuration screen 50 (FIG. 5).

As fields for storing management information relating to the configuration of the overall storage group SG, this group configuration information table 80 is provided with a "Group identifying information" field 80A, a "Group type" field 80B, a "mode" field 80C, a "status" field 80D, a "number of apparatuses" field 80E, a "priority identifier" field 80F and an "option" field 80G.

Among the above, the "Group identifying information" field 80A stores identifying information such as the name of the storage group SG, and the "Group type" field 80B stores a value corresponding to the format of this storage group SG (for example, "1" if it is a mirror type, and "4" if it is an N+1 type described later). Further, the "mode" field 80C stores the operational mode per group type (e.g. "online" or "in maintenance", etc.), and the "status" field 80D stores the current storage group SG status (e.g. "normal operation" or "recovering", etc.).

Moreover, the "number of apparatuses" field 80E stores the number of storage apparatus 5 configuring the storage group SG, and the "priority identifier" field 80F stores the priority number of the own storage apparatus in the storage group SG. Further, the "option" field 80G stores option information (e.g. "read/write" or "WORM", etc.) of an option flag or the like relating to the operation of the overall storage group SG.

Further, as fields for storing management information such as configuration information per storage apparatus configuring the storage group SG, the group configuration information table 80 is provided with a "priority identifier" field 80H, an "apparatus parameter" field 80I and a "configuration information" field 80J respectively associated to these storage apparatuses 5.

Among the above, the "priority identifier" field 80H stores the priority number ("priority") of the storage apparatus 5 in the storage group SG, information ("attribute information") representing the attribute of the storage apparatus 5 such as master, submaster or slave, and information ("status") representing the current status of the storage apparatus 5. A failure information flag described later is stored in this "priority identifier" field 80H as information representing the current status of the storage apparatus 5.

Further, the "apparatus parameter" field 80I stores information unique to the hardware of the storage apparatus 5 such as, for example, the model name ("model name") and type ("device type") of the storage apparatus 5, network address ("port identifier") given to the port of the storage apparatus 5, and network interface type ("I/F type"), corresponding communication protocol ("corresponding protocol") and transfer rate ("transfer rate") of the storage apparatus 5.

Further, the "configuration information" field 80J stores information relating to the internal configuration of the storage apparatus 5 such as information on the LUN of the respective volumes created in the storage apparatus 5 ("LU configuration"), capacity ("capacity") of the respective volumes, RAID configuration ("RAID configuration") of the respective RAID groups, attribute ("attribute") of the respective volumes and type ("HDD type") of the disk device 10 (FIG. 1).

Figure 8:
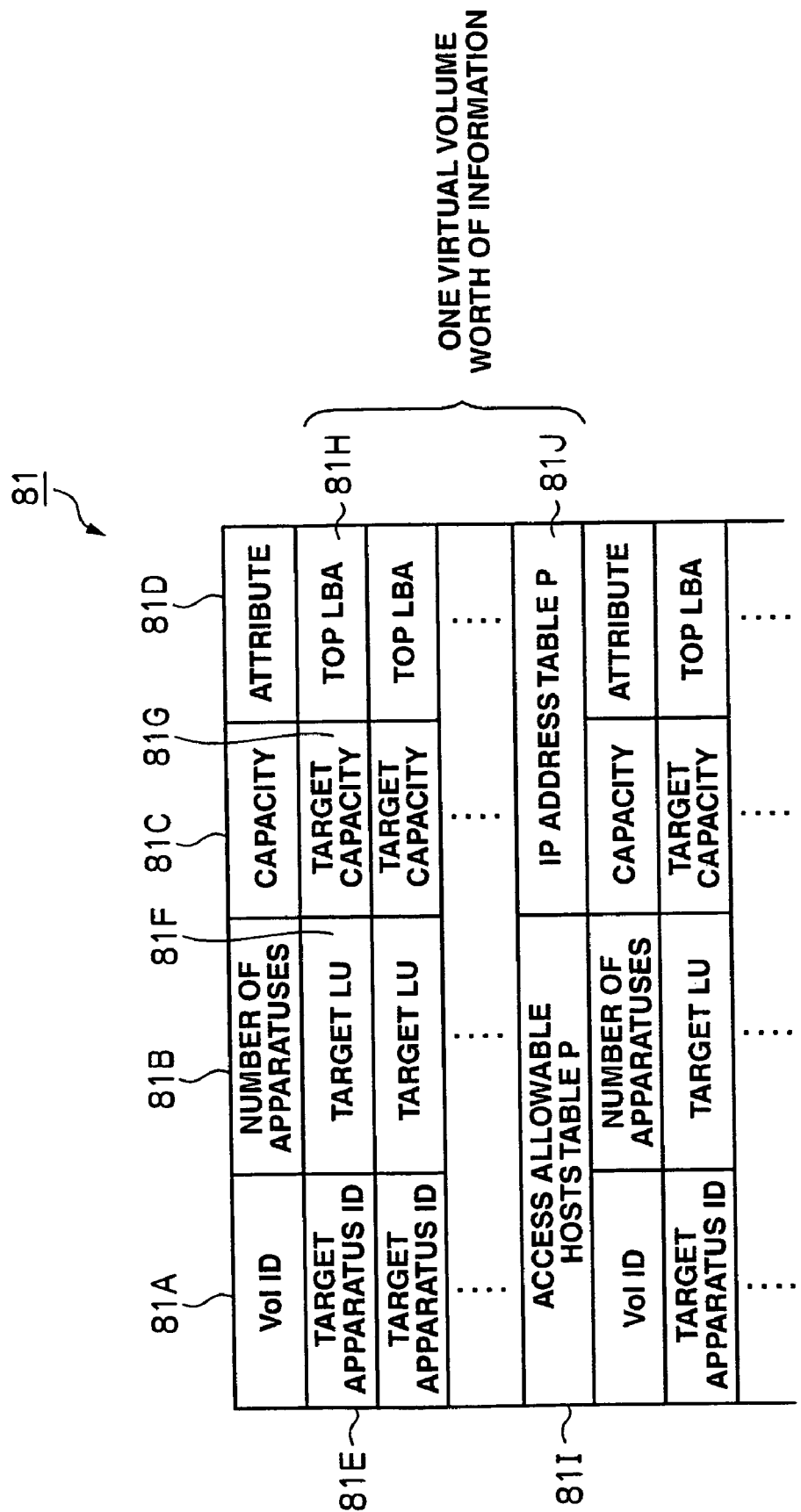
FIG. 8 is a conceptual diagram showing a virtual volume configuration information table.

Meanwhile, FIG. 8 shows a table (this is hereinafter referred to as a "virtual volume configuration information table") 81 for managing the virtual volumes configured in the storage group SG. This virtual volume configuration information table 81 is created by the master storage apparatus 5 based on configuration information of the virtual volume VVOL configured when the administrator creates a new virtual volume VVOL using the maintenance management terminal 26 (FIG. 2) of the storage apparatus 5, and is subsequently transmitted to all storage apparatuses 5 in the storage group SG, respectively. Therefore, all storage apparatuses 5 in the storage group SG will retain the same virtual volume configuration information table 81, and each storage apparatus 5 is able to refer to the virtual volume configuration information table 81 as necessary.

The virtual volume configuration information table 81 respectively stores, regarding all virtual volumes VVOL created in the storage group SG and for each virtual volume VVOL, a "Vol ID" field 81A, a "number of apparatuses" field 81B, a "capacity" field 81C, an "attribute" field 81D, a "target apparatus ID" field 81E, a "target LU" field 81F, a "target capacity" field 81G, an "initial LBA" field 81H, an "access allowable hosts table P" field 81I and an "IP address table P" field 81J.

Among the above, the "Vol ID" field 81A stores the identifier (LUN or the like) of the virtual volume VVOL, and the "number of apparatuses" field 81B stores the number of storage apparatuses 5 configuring the virtual volume VVOL. Further, the "capacity" field 81C and "attribute" field 81D store the capacity and attribute of the respective virtual volumes VVOL.

Further, the "target apparatus ID" field 81E stores identifying information of the storage apparatuses 5 configuring the virtual volume VVOL, and the "target LU" field 81F, "target capacity" field 81G and "initial LBA" field 81H store the identifying information, capacity and initial LBA of the volume VOL in the storage apparatus 5 used by the respective virtual volumes VVOL. When the virtual volume VVOL is configured from a plurality of volumes VOL, the "target apparatus ID" field 81E, "target LU" field 81F, "target capacity" field 81G and "initial LBA" field 81H are respectively associated and provided to each volume VOL.

Further, the "access allowable hosts table P" field 81I stores a pointer to a table (not shown) registering the identifiers of the respective host systems 2 permitted to access the virtual volume VVOL, and the "IP address table P" field 81J stores a pointer to a table (not shown) registering the respective IP addresses of these host system 2.

Figures 9, 12:
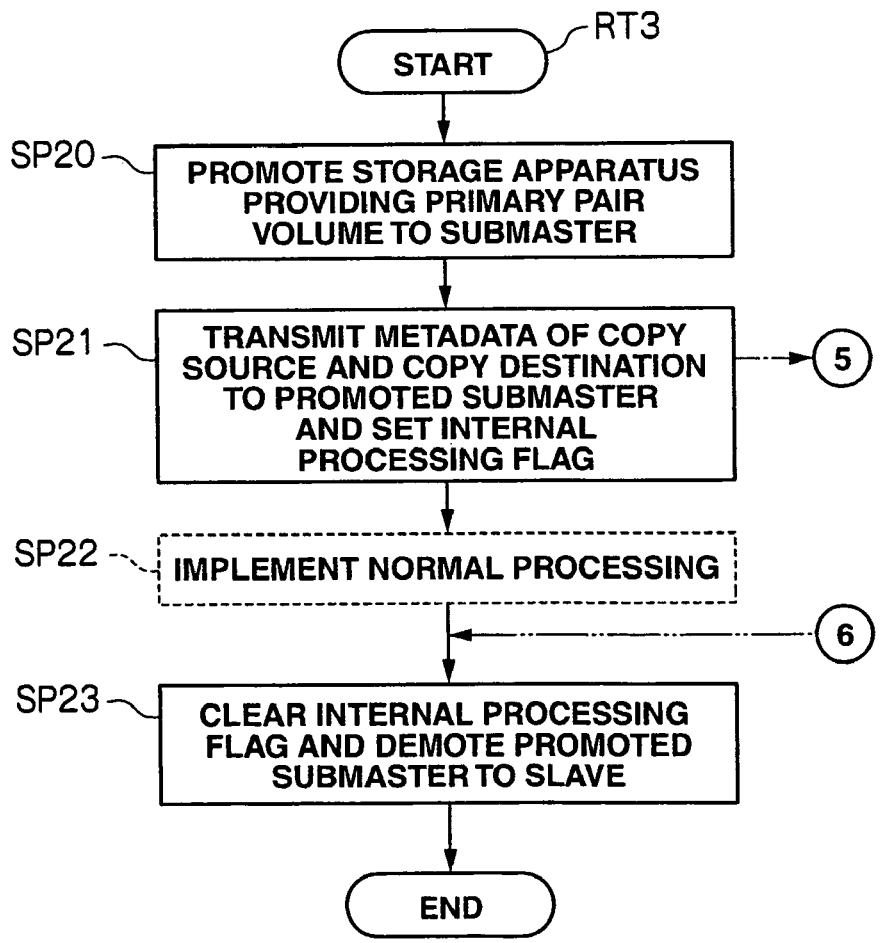
FIG. 9 is a conceptual diagram showing a group operational mode management table.
FIG. 12 is a flowchart showing the master pair connection processing routine.

In the meantime, FIG. 9 shows a group operational mode management table group 82 retained by the respective storage apparatuses 5 configured as constituent elements of the storage group SG. Each storage apparatus 5 retains, in this kind of table group format, information relating to the mode configuration among the group configuration information configured by the administrator using the foregoing mode configuration screen 70 (FIG. 6).

This group operational mode management table group 82 is configured from a master operational configuration information table 82A, a submaster operational configuration information table 82B and a slave operational configuration information table 82C. And, the master operational configuration information table 82A, submaster operational configuration information table 82B and slave operational configuration information table 82C are provided with a "mode" field 83A and a "parameter" field 83B as fields for storing the configuration contents of the respective storage apparatuses 5.

And the "mode" field 83A of the respective operational configuration information tables 82A to 82C stores the operational mode (e.g. "Normal" or "Parity creation", etc.) configured respectively regarding the master storage apparatus 5, submaster storage apparatus 5 or slave storage apparatus 5, and the "parameter" field 83B stores the identifier of the storage apparatus 5 to back up the metadata, bandwidth duty factor (numerical value) based on QoS configured regarding the master storage apparatus 5, and so on.

(1-2-2-2) Host Data I/O Processing and Internal Processing in Storage Group

With the storage group SG, since the master storage apparatus 5 virtualizes the storage area provided by the respective storage apparatuses 5, the host system 2 recognizes the storage group SG as a single storage apparatus 5' as displayed on the right side of FIG. 3. Virtual volumes VVOL, which are virtualizations of the volumes VOL created in the respective storages 5, exist inside the storage apparatus 5', and the host system 2 requests the data I/O request designating these virtual volumes VVOL to the master storage apparatus 5.

Here, let it be assumed that the volume VOL created in the storage apparatus 5A (master) of "1" shown in FIG. 3 is a primary volume to be used by the user for reading and writing data, the volume VOL created in the storage apparatus 5B (submaster) of "2" is a secondary volume for storing the backup data of the primary volume VOL, the volume VOL created in the storage apparatus 5C (slave) of "3" is a primary snapshot volume for storing data of the snapshot as the data image at a certain time of the primary volume, and the volume VOL created in the storage apparatus 5D (slave) of "4" is a secondary snapshot volume for storing the backup data of the snapshot volume.

With a conventional storage system, when data of a write request is given from the host system 2 to the storage apparatus 5A of "1" in FIG. 3, this storage apparatus 5A foremost reads the data of the writing position from the primary volume, saves this in the primary snapshot volume and secondary snapshot volume, and thereafter the storage apparatus 5A of "1" in FIG. 3 writes the data to be written in the primary volume and secondary volume. Such conventional storage system is able to write the data in the primary volume by executing the foregoing sequential processing.

Contrarily, with the storage system 1 according to this embodiment, among the sequential processing to be performed in reply to the data write request from the host system 2, only the writing processing of the data to be written in the primary volume issued from the host system 2 is performed with the master storage apparatus 5 (storage apparatus 5A), and all other internal processes are performed with the submaster storage apparatus 5 (storage apparatus 5B).

Figure 10:
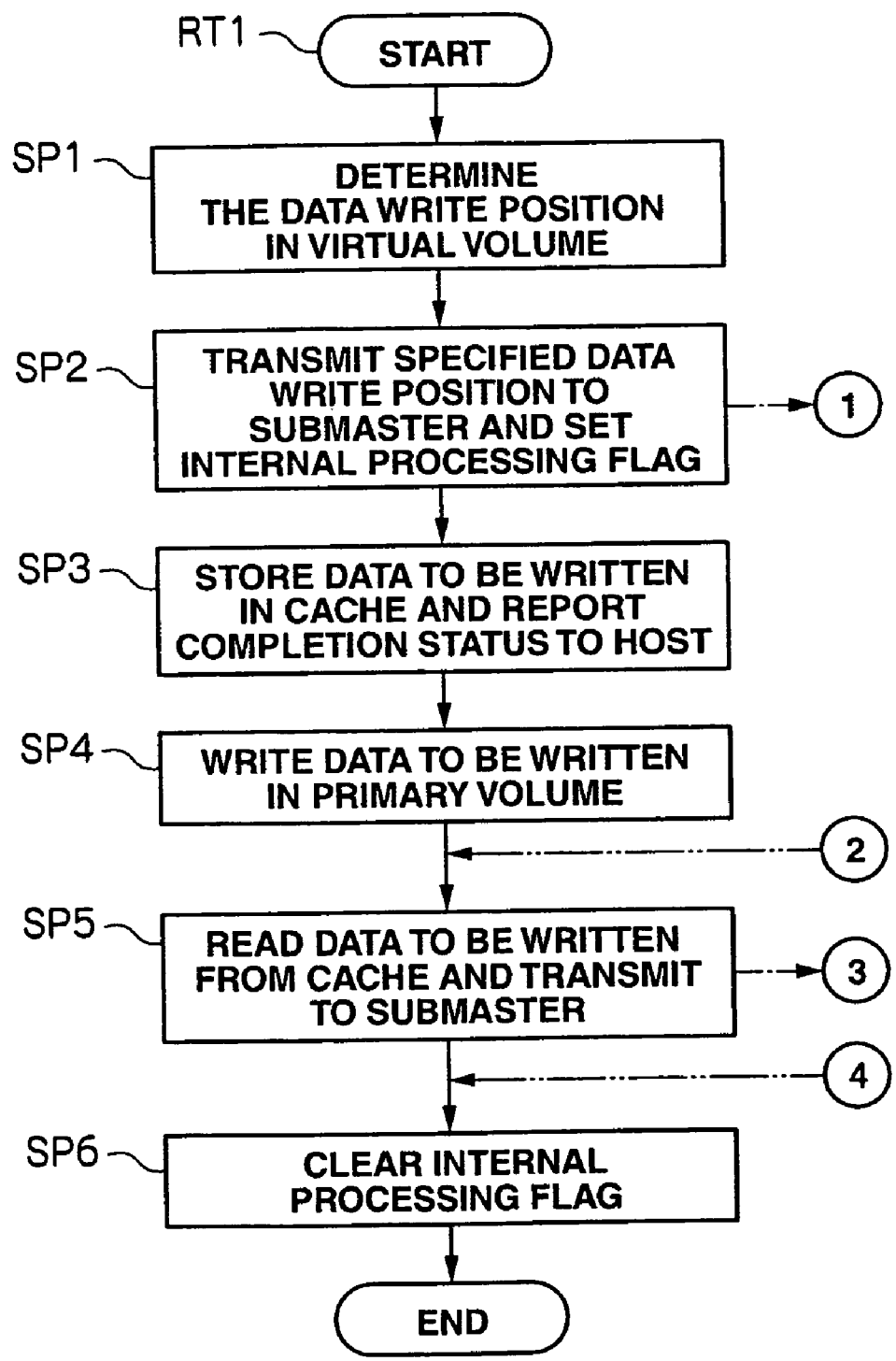
FIG. 10 is a flowchart showing the master-side data write processing routine.
Figure 11:
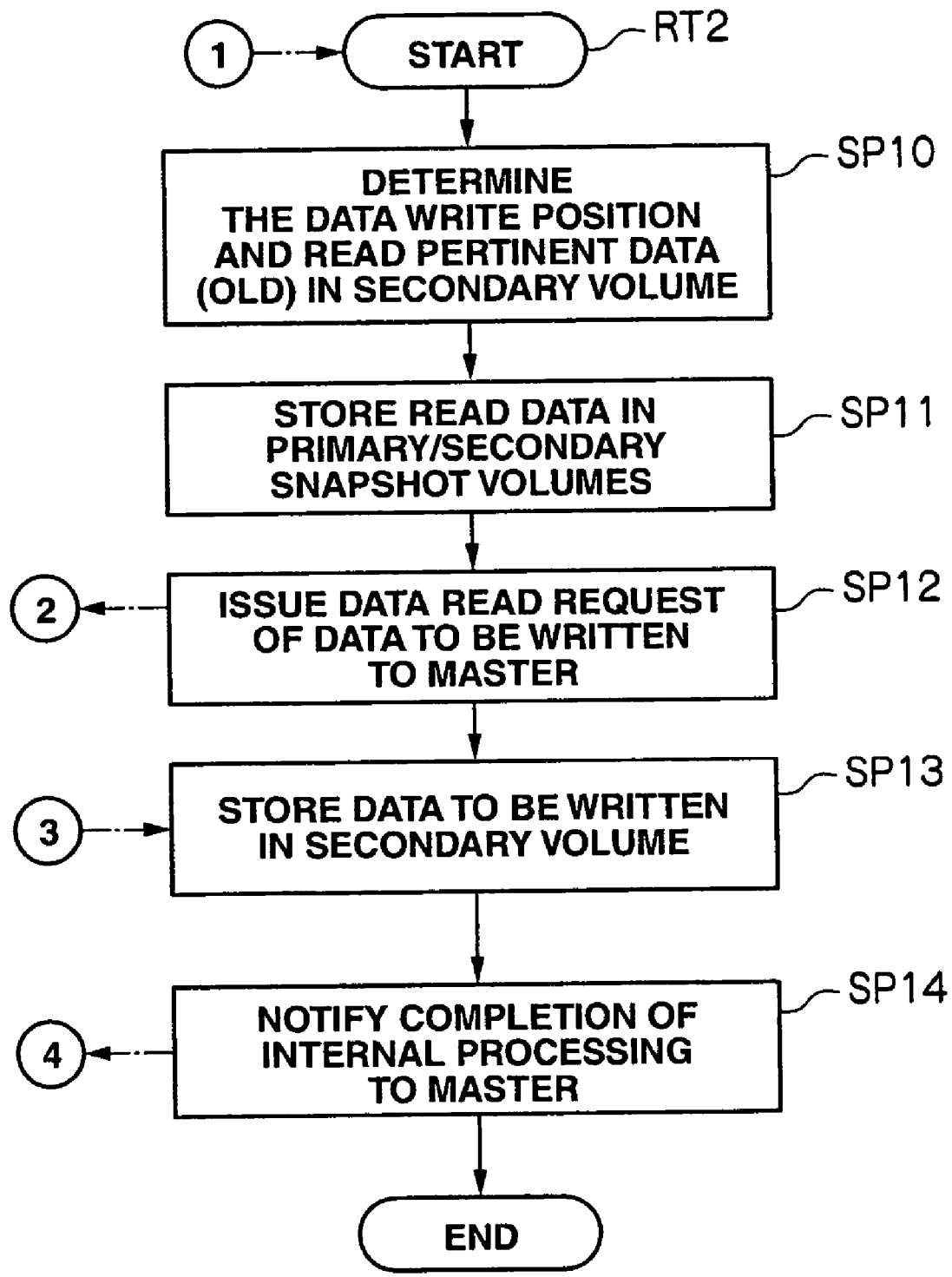
FIG. 11 is a flowchart showing the submaster-side data write processing routine.

FIG. 10 is a flowchart showing the sequential processing steps to be performed by the CPU of the master storage apparatus 5 (this is hereinafter referred to as a "master-side CPU") 21 when this kind of data write request is issued from the host system 2, and FIG. 11 is a flowchart showing the sequential processing steps to be performed by the CPU of the submaster storage apparatus 5 (this is hereinafter referred to as a "submaster-side CPU") 21 in the foregoing case.

When the master-side CPU 21 receives the data write request and data to be written from the host system 2, based on the control program stored in the corresponding to the local memory 22 (FIG. 2) and according to a master-side data write processing routine RT1 shown in FIG. 10, it foremost determines the address in the corresponding virtual volume VVOL to which data is to be written based on the data write request (SP1).

Next, the master-side CPU 21 transmits the address specified at step SP1 as data write position information (metadata) to the submaster storage apparatus 5. Further, the master-side CPU 21 sets (turns on) a flag (this is hereinafter referred to as an "internal processing flag") for storing the fact that internal processing is being performed in the storage group SG to which the own storage apparatus belongs (SP2).

Thereafter, the master-side CPU 21 stores the data to be written provided from the host system 2 in the cache memory 24, and transmits a completion status report to the host system 2, which is the transmission source of this data, indicating that the data write processing is complete (SP3).

Then, the master-side CPU 21 writes the data to be written retained in the cache memory 24 in a corresponding address position in the primary volume (SP4). Further, when the master-side CPU 21 thereafter receives a read request of the data to be written from the submaster storage apparatus 5 as described later, it reads the data to be written provided by the host system 2 from the cache memory 24, and transfers this to the submaster storage apparatus 5 (SP5).

Further, the master-side CPU 21 thereafter clears (turns off) the internal processing flag turned on at step SP2 (SP6), and ends this sequential data write processing.

Meanwhile, when the submaster-side CPU 21 receives data write position information transmitted from the master storage apparatus 5 at step SP1 of the master-side data write processing routine RT1, based on the control program stored in the local memory 22 and according to a submaster-side data write processing routine RT2 shown in FIG. 11, it foremost determines the address to which data is to be written based on the data write position information, and reads the data before being updated by the data to be written from the corresponding address position in the secondary volume (SP10).

Next, the submaster-side CPU 21 transmits the data read from the secondary volume at step SP10, together with the data write request of such data, to the storage apparatus 5 (storage apparatus 5C in FIG. 3) providing the primary snapshot volume and the storage apparatus 5 (storage apparatus 5D in FIG. 3) providing the secondary snapshot volume (SP11). Thereby, the submaster-side CPU 21 stores (saves) such data in the primary snapshot volume and secondary snapshot volume.

Then, the submaster-side CPU 21 transmits to the master storage apparatus 5 a data read request of the data to be written provided by the host system 2 (SP12). And, when the data to be written is thereafter transmitted from the master storage apparatus 5, the submaster-side CPU 21 writes this in the address position specified at step SP10 in the secondary volume of the own storage apparatus (SP13).

Further, the submaster-side CPU 21 thereafter notifies the master storage apparatus 5 that the internal processing is complete (SP14), and subsequently ends this sequential processing.

Next, explained is a case where, in order to pair-configuration (mirroring) a volume created in the storage apparatus 5E of FIG. 3 (this is hereinafter referred to as a "primary pair volume") and a volume VOL created in the storage apparatus 5F of FIG. 3 (this is hereinafter referred to as a "secondary pair volume"), internal processing for copying the data content of the primary pair volume to the secondary pair volume without change is executed.

In this case, it would be a significant load on the submaster storage apparatus 5B to perform this internal processing in parallel with the other internal processing. Thus, with the storage system 1 according to this embodiment, in the foregoing case, the master storage apparatus 5 promotes the storage apparatus 5 (5E) providing the primary pair volume of the copy source to a submaster, and this promoted submaster storage apparatus (this is hereinafter referred to as a "promoted submaster storage apparatus") 5 executes the internal processing for copying the data content of the primary pair volume to the secondary pair volume.

Figure 13:
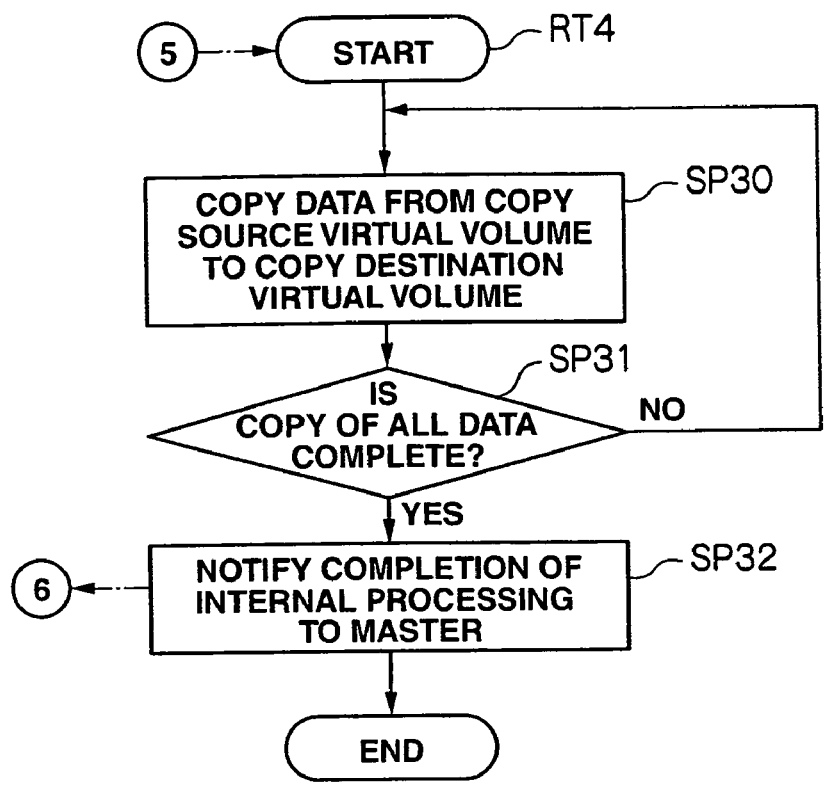
FIG. 13 is a flowchart showing the master pair connection processing routine.

FIG. 12 is a flowchart showing the sequential processing steps to be performed by the CPU (master-side CPU) 21 in the master storage apparatus in relation to this kind of internal processing, and FIG. 13 is a flowchart showing the sequential processing steps to be performed by the CPU of the promoted submaster storage apparatus 5 (this is hereinafter referred to as a "promoted submaster-side CPU") 21 in the foregoing case.

When the master-side CPU 21 receives from the maintenance management terminal 26 (FIG. 2) a command for pair-coupling, for instance, the primary pair volume created in the storage apparatus 5E of "5" in FIG. 3 and the secondary pair volume created in the storage apparatus 5F of "6" in FIG. 3, based on the corresponding control program stored in the local memory 22 and according to a master pair connection processing routine RT3 shown in FIG. 12, it foremost promotes the storage apparatus 5E providing the primary pair volume to a submaster (SP20).

When changing the attribute of the storage apparatus 5 as described above, this is implemented by transmitting the group configuration information table 80 (FIG. 7), in which the attribute of the storage apparatus 5 providing the primary pair volume has been changed to a submaster, to all storage apparatuses 5 configuring the storage group SG. The CPU 21 of the respective storage apparatuses 5 that received this updated group configuration information table 80 replaces the existing group configuration information table 80 with the updated group configuration information table 80. As a result, all storage apparatuses 5 in the storage group SG will be able to recognize that the storage apparatus 5 providing the primary pair volume has been promoted to a submaster.

Next, the master-side CPU 21 transmits the identifying information (metadata) of the virtual volume VVOL designated as the copy source and the virtual volume designated as the copy destination to the promoted submaster storage apparatus 5 that was promoted to a submaster, and thereafter set (turns on) the internal processing flag (SP21). Further, the master-side CPU 21 thereafter returns to the normal processing to be performed to the data I/O request from the host system 2 (SP22).

And, when the master-side CPU 21 eventually receives a notice from the promoted submaster storage apparatus 5 to the effect that the internal processing has ended as a result of the data copy from the primary pair volume to the secondary pair volume described later is complete, it clears the internal processing flag and demotes the promoted submaster storage apparatus 5 to a slave (SP23). The change of attribute of the storage apparatus 5 as described above can also be performed by transmitting the group configuration information table 80, in which the attribute of the promoted submaster storage apparatus 5 has been changed to a slave, to all storage apparatuses 5 configuring the storage group SG.

Then, the master-side CPU 21 thereafter ends this sequential processing.

Meanwhile, when the promoted submaster-side CPU 21 receives the metadata transmitted from the master storage apparatus 5 at step SP21 of the master-side data write processing routine RT3, based on the control program stored in the local memory 22 and according to a submaster pair connection processing routine RT4 shown in FIG. 13, it foremost reads data in prescribed units from the primary pair volume in the own storage apparatus designated as the copy source, and transfers this to the storage apparatus 5F of "6" in FIG. 3. Further, the promoted submaster-side CPU 21 controls the storage apparatus 5F of "6" in FIG. 3 based on this metadata so as to write the data transmitted from the storage apparatus 5E of "5" in FIG. 3 in the secondary pair volume corresponding to the virtual volume VVOL designated as the copy destination (SP30).

Then the promoted submaster-side CPU 21 subsequently determines whether all data in the primary pair volume has been copied to the secondary pair volume (SP31), and, upon receiving a negative result, it repeats similar processing until all data in the primary pair volume is copied to the secondary pair volume (SP30-SP31-SP30).

When all data in the primary pair volume is eventually copied to the secondary pair volume, the promoted submaster-side CPU 21 notifies the master-side CPU 21 that the internal processing is complete (SP32), and thereafter ends this sequential processing.

Incidentally, upon performing the data copy processing from the primary pair volume to the secondary pair volume of FIG. 3 as described above, the storage apparatus 5F having the secondary pair volume may be promoted to a submaster. Nevertheless, considering that the contents of the primary pair volume could be updated during the copy processing, it is desirable to promote the storage apparatus 5E to a submaster as described above.

(1-2-2-3) Failure Detection Method and Failure Recovery Processing in Storage Group SG Next, the detection method of a failure in the storage apparatus 5 configured as a master, submaster or slave and the recovery method thereof in the storage group SG is explained. Incidentally, in the following explanation, as described above with reference to FIG. 3, a general example including cases other than the storage apparatus 5A providing the primary volume being configured as a master and the storage apparatus 5B providing the secondary volume being configured as a submaster is explained.

(1-2-2-3-1) Detection Method of Failure in Submaster and Recovery Method Thereof The master storage apparatus 5 detects a failure in the submaster storage apparatus 5. This is because the master storage apparatus 5 is able to conduct a check upon transmitting metadata to the submaster storage apparatus 5 at step SP2 of the master-side data write processing routine RT1 shown in FIG. 10.

When the master storage apparatus 5 detects a failure in the submaster storage apparatus 5, the master storage apparatus 5 promotes the storage apparatus 5 given the next highest priority number after the submaster storage apparatus 5 to a submaster.

As the means for this, the master storage apparatus 5 foremost transfers the metadata in its possession to the storage apparatus 5 to be newly promoted to a submaster. The master storage apparatus 5 thereafter transmits the new group configuration information table 80 (FIG. 7), which has a raised failure information flag representing that a failure occurred in the original submaster storage apparatus 5, to all storage apparatuses 5 in the storage group SG.

When the respective storage apparatuses 5 in the storage group SG receive the new group configuration information table 80, they refer to this group configuration information table 80 and reconfirm their own priority number. As a result, the storage apparatus 5 given the next highest priority number after the submaster storage apparatus 5 subject to a failure recognizes that the own storage apparatus should be promoted to a submaster, and changes the attribute of the own storage apparatus to a submaster.

The storage apparatus (promoted submaster storage apparatus) 5 that was promoted to a submaster executes volume recovery processing for recovering the volume VOL that was provided by the original submaster storage apparatus 5 such as by distributing it to the remaining storage apparatuses 5 including the own storage apparatus.

When the promoted submaster storage apparatus 5 completes the foregoing volume recovery processing, it notifies the completion of the volume recovery processing to the master storage apparatus 5. As a result, the new group configuration information table 80 reflecting the change in configuration of the storage group SG based on the volume recovery processing is transmitted from the master storage apparatus 5 to all storage apparatuses 5 in the storage group SG.

While the promoted submaster storage apparatus 5 is executing the volume recovery processing, the master storage apparatus 5 temporarily stores data from the host system 2 to be written in the volume VOL that was provided by the original submaster storage apparatus 5 subject to a failure in a volume (this is hereinafter referred to as a "temporary save volume") in a storage apparatus 5 that will have little affect on the own storage apparatus or volume recovery processing together with metadata (data of the write destination of such data). Further, for example, if the volume provided by the original submaster storage apparatus 5 is a primary or secondary snapshot volume, the writing of differential data in such snapshot volume is also inhibited.

When the copy processing of copying the data of the volume VOL that was provided by the original submaster storage apparatus 5 to the volume VOL provided by another storage apparatus 5 is complete, the master storage apparatus 5 orders the promoted submaster storage apparatus 5 to write the data from the host system 2 that was stored in the temporary save volume in the corresponding volume VOL. As a result, here, the promoted submaster storage apparatus 5 performs processing for writing this data in the corresponding address position of the corresponding volume VOL based on the metadata being stored with such data. When there is a snapshot volume of this volume VOL, the data save processing performed to the snapshot volume that was suspended is additionally performed.

Until a notice indicating the completion of the volume recovery processing is provided from the promoted submaster storage apparatus 5, the master storage apparatus 5 continues the save processing of saving the data, which was provided from the host system 2 and which is to be written in the volume VOL of the original submaster storage apparatus 5, in the temporary save volume. Here, the master storage apparatus 5 notifies the promoted submaster storage apparatus 5 each time it writes the data from the host system 2 in the temporary save volume.

When the promoted submaster storage apparatus 5 completes the write processing (this is hereinafter referred to as "remaining data write processing") of the data saved in the temporary save volume in the corresponding volume VOL, it notifies the master storage apparatus 5 that the internal processing is complete.

When the master storage apparatus 5 receives this notice, it stops saving the data to be written transmitted from the host system 2 in the temporary save volume, and starts merging the metadata. Incidentally, this merge processing is performed while the promoted submaster storage apparatus 5 is executing the remaining data write processing, and this may be handled by the master storage apparatus 5, or the master storage apparatus 5 and promoted submaster storage apparatus 5 may respectively perform merge processing to examine each other's metadata.

Then, the storage group SG performs processing as normal with the new configuration described above.

Figure 14:
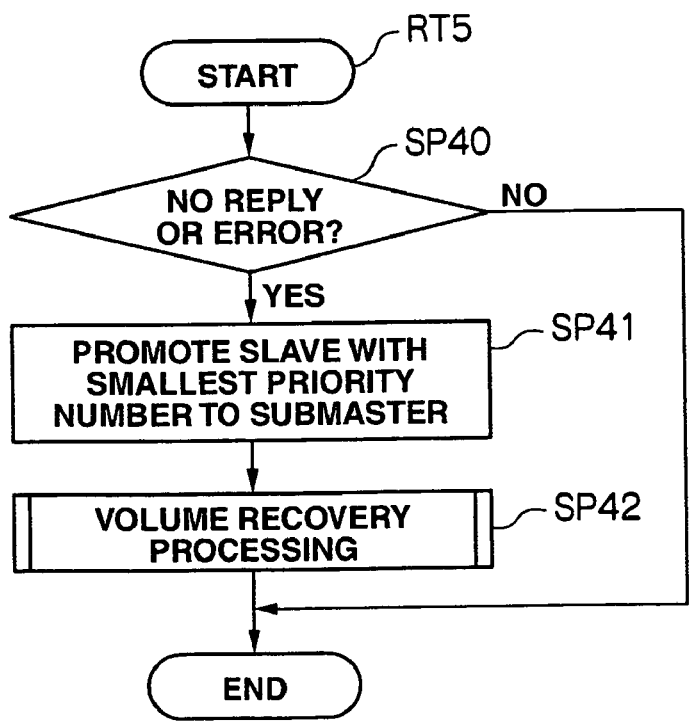
FIG. 14 is a flowchart showing the first failure detection/recovery processing routine.

Here, FIG. 14 is a flowchart showing the processing steps of the CPU (master-side CPU) 21 of the master storage apparatus 5 in relation to the failure detection/volume recovery processing of the submaster storage apparatus 5. When the master-side CPU 21 transmits metadata to the submaster storage apparatus at step SP2 of the master-side data write processing routine RT1 shown in FIG. 10, based on the control program stored in the local memory 22 and according to a first failure detection/recovery processing routine RT5 shown in FIG. 14, it executes the sequential failure detection/volume recovery processing described above.

In other words, when the master-side CPU 21 transmits metadata to the submaster storage apparatus 5 at step SP2 of the master-side data write processing routine RT1, it executes this first failure detection/recovery processing routine RT5 in parallel with the master-side data write processing routine RT1, and, foremost, after the transmission of such metadata, determines whether a notice has not been received from the submaster storage apparatus 5 indicating the completion of the internal processing even after the lapse of a prescribed period, or whether an error notice indicating that the internal processing could not be ended normally was given from the submaster storage apparatus 5 (SP40).

To obtain a negative result in the foregoing determination means that no failure has occurred in the submaster storage apparatus 5, and that the master-side CPU 21 received the completion notice of internal processing from the submaster storage apparatus 5 within a prescribed period from the transmission of such metadata. As a result, here, the master-side CPU 21 ends the current failure detection processing performed to the submaster storage apparatus 5.

Contrarily, to obtain a positive result in the determination at step SP40 means that a failure has occurred in the submaster storage apparatus 5. As a result, here, the master-side CPU 21 refers to the group configuration information table 80 and configures the priority number of the submaster storage apparatus 5 to be a maximum value (smallest priority), and demotes the attribute to a slave on the one hand, and promotes the slave storage apparatus 5 given the next highest priority number after the submaster storage apparatus 5 to a new submaster according the method described above (SP41).

Figure 15:
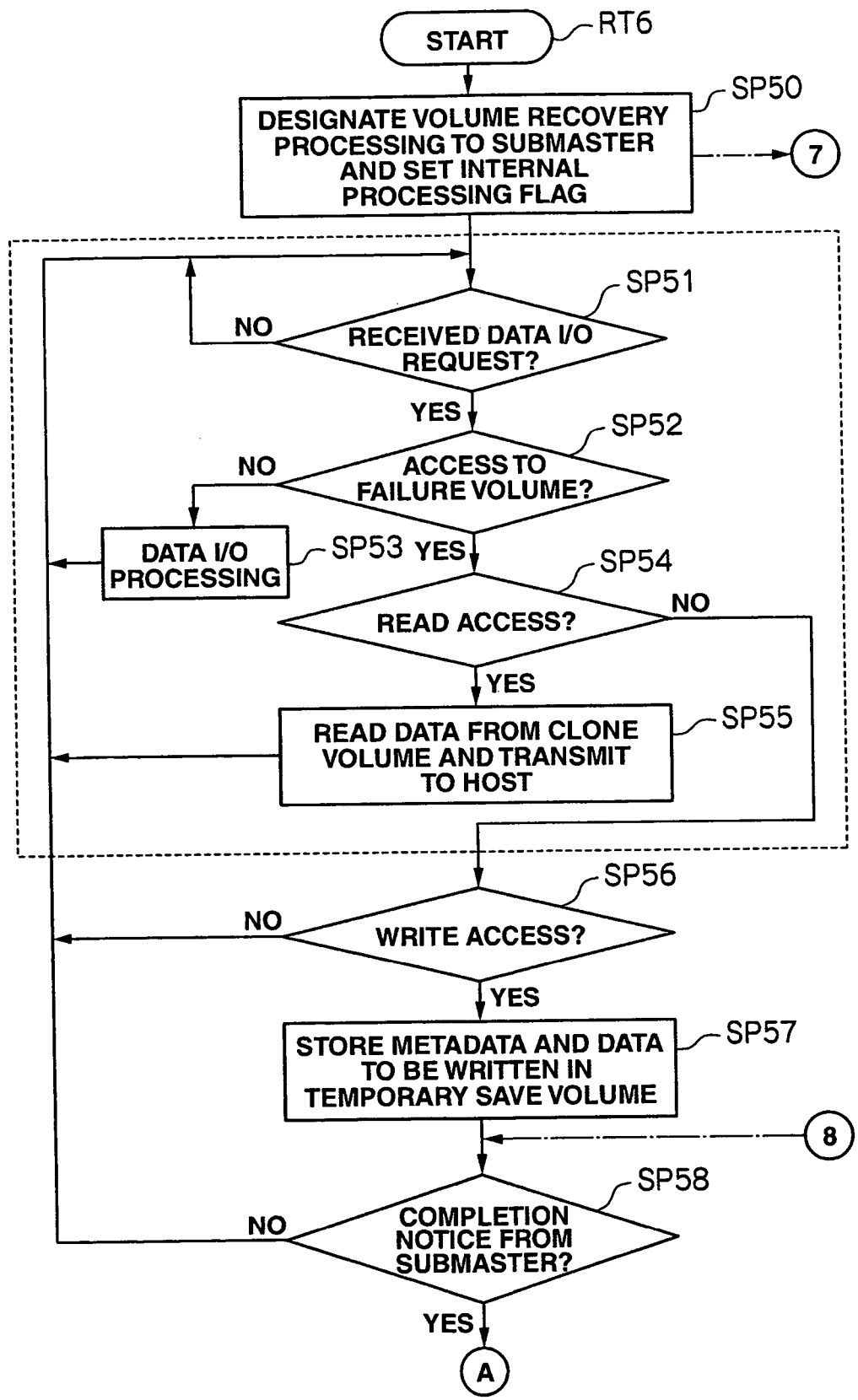
FIG. 15 is a flowchart showing the master-side volume recovery processing routine.
Figure 16:
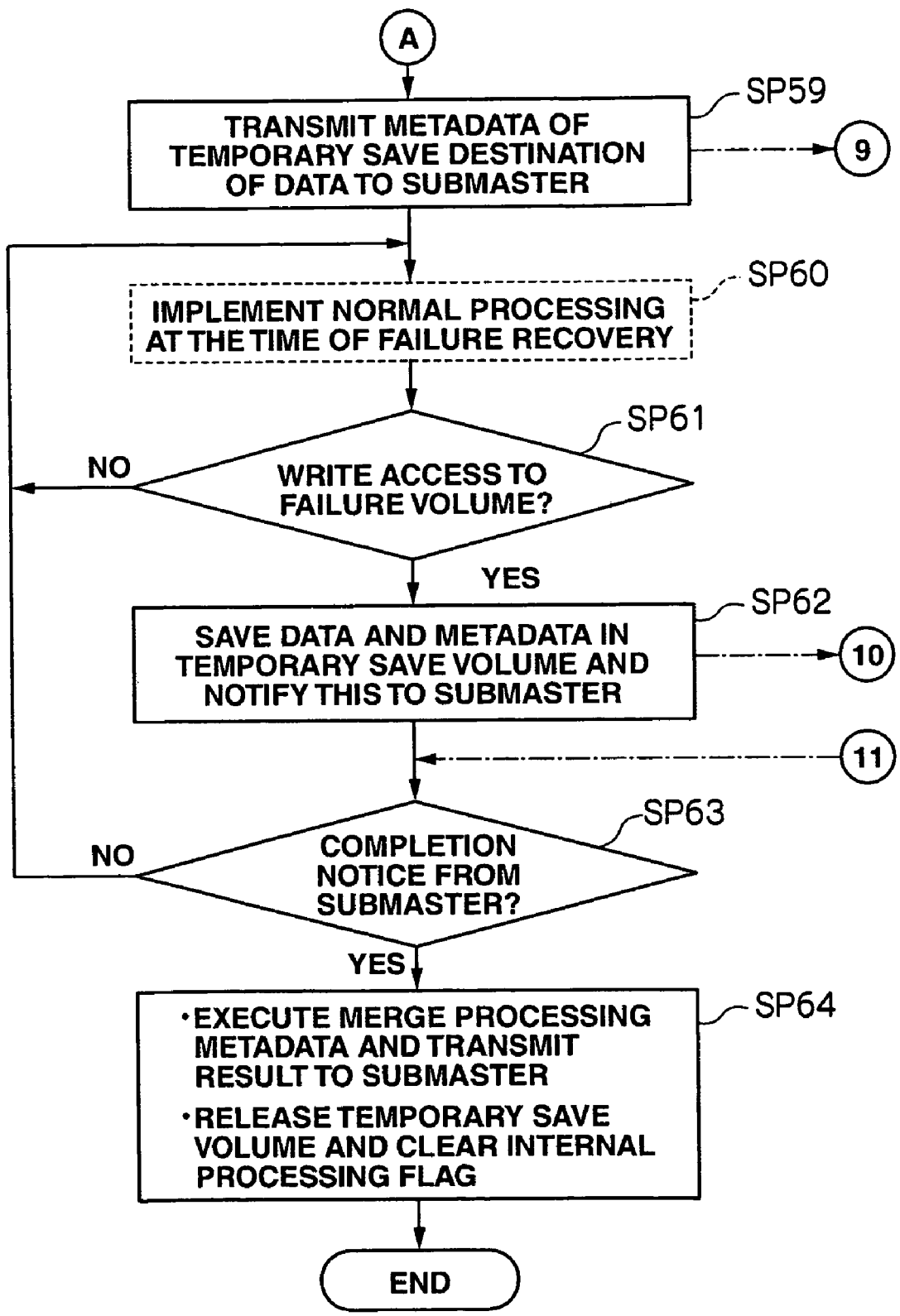
FIG. 16 is a flowchart showing the master-side volume recovery processing routine.

Further, the master-side CPU 21 thereafter executes recovery processing of such failure based on the control program stored in the local memory 22 and according to a master-side volume recovery processing routine RT6 shown in FIG. 15 and FIG. 16 (SP42).

Specifically, when the master-side CPU 21 proceeds to step SP42 of the first failure detection/recovery processing routine RT5, it starts this master-side volume recovery processing routine RT6 and, foremost, gives an order (this is hereinafter referred to as a "volume recovery command") for recovering the volume VOL provided by the original submaster storage apparatus 5 to the storage apparatus (promoted submaster storage apparatus) 5 newly promoted to a submaster, and also sets (turns on) the internal processing flag (SP50).

Thereafter, the master-side CPU 21 waits to receive a data I/O request from the host system 2 (SP51) and, upon receiving such data I/O request, determines whether this data I/O request is made to the virtual volume VVOL associated with the volume VOL provided by the original submaster storage apparatus 5 subject to a failure (SP52).

When the master-side CPU 21 obtains a negative result in this determination, it executes normal data I/O processing according to the data I/O request (SP53), thereafter returns to step SP51, and waits to receive the subsequent data I/O request from the host system 2.

Contrarily, when the master-side CPU 21 obtains a positive result in this determination, it determines whether the data I/O request is a data read request (SP54). And when the master-side CPU 21 obtains a positive result in this determination, it reads the corresponding data by controlling the storage apparatus 5 providing the secondary volume corresponding to the volume VOL (in this case, this volume VOL is a primary volume) provided by the original submaster storage apparatus 5 subject to a failure. Further, the master-side CPU 21 transfers this data to the host system 2 that transmitted the data I/O request (data read request) (SP55), and thereafter returns to step SP51 and waits to receive the subsequent data I/O request from the host system 2.

Contrarily, when the master-side CPU 21 obtains a negative result at step SP54, it determines whether the data I/O request received at step SP51 is a data write request (SP56). And when the master-side CPU 21 obtains a negative result in this determination, it returns to step SP51 and waits to receive the subsequent data I/O request from the host system 2. Incidentally, explanation on the processing to the performed by the master in this situation is omitted.

Contrarily, when the master-side CPU 21 obtains a positive result at step SP56, it temporarily stores the metadata representing the address position of the write destination of the data obtained based on the data I/O request (data write request) received at step SP51, and the data to be written transmitted from the host system 2 together with the data I/O request in a temporary storage volume to be created in the unused capacity provided by an arbitrary storage apparatus 5 that has no effect on the recovery processing that is currently being executed, or temporarily saves this in an arbitrary volume VOL (SP57). In the following explanation, the volume VOL for temporarily storing such data to be written and metadata is referred to as a "temporary save volume VOL".

Thereafter, the master-side CPU 21 determines whether a notice indicating the completion of volume recovery processing has been transmitted from the promoted submaster storage apparatus 5 as described later (SP58), and, upon obtaining a negative result, returns to step SP51 and waits to receive the subsequent data I/O request from the host system 2.

Meanwhile, when the master-side CPU 21 obtains a positive result in the determination at step SP58, it transmits the temporary save volume VOL that stored the data to be written and metadata at step SP57, and metadata such as the address position of the save destination in the temporary save volume VOL to the promoted submaster storage apparatus 5 (SP59).

Further, the master-side CPU 21 thereafter executes the data I/O processing during the failure recovery processing explained with reference to step SP51 to step SP55 (SP60), and, in this data I/O processing, when data I/O processing to the virtual volume VVOL associated with the volume VOL provided by the original submaster storage apparatus 5 subject to a failure is provided from the host system 2 and this data I/O processing is not a data read request (SP60), it determines whether this data I/O processing is a data write request to the virtual volume VVOL associated with the volume VOL provided by the original submaster storage apparatus 5 (SP61).

When the master-side CPU 21 obtains a negative result in this determination, it returns to the data I/O processing during the failure recovery processing at step SP60, and, when the master-side CPU 21 obtains a positive result, it temporarily saves the metadata representing the data write destination obtained based on the data write request, and the data to be written transmitted from the host system 2 together with the data write request in the foregoing temporary save volume VOL (SP62). Further, the master-side CPU 21 notifies the submaster storage apparatus 5 that the data to be written and its metadata have been saved in the temporary save volume VOL (SP62).

Then, the master-side CPU 21 thereafter determines whether a notice indicating the completion of volume recovery processing has been sent from the submaster storage apparatus 5 (SP63) and, upon obtaining a negative result, returns to the data I/O processing during the failure recovery processing (SP60).

Contrarily, when the master-side CPU 21 obtains a positive result in this determination, it implements merge processing to the metadata of the volume VOL, and transmits and stores this metadata to and in the promoted submaster storage apparatus 5. Further, the master-side CPU 21 releases the configuring of making the temporary save volume VOL a volume VOL for temporarily saving data, further clears the internal processing flag, and thereafter ends this sequential recovery processing.

Figure 17:
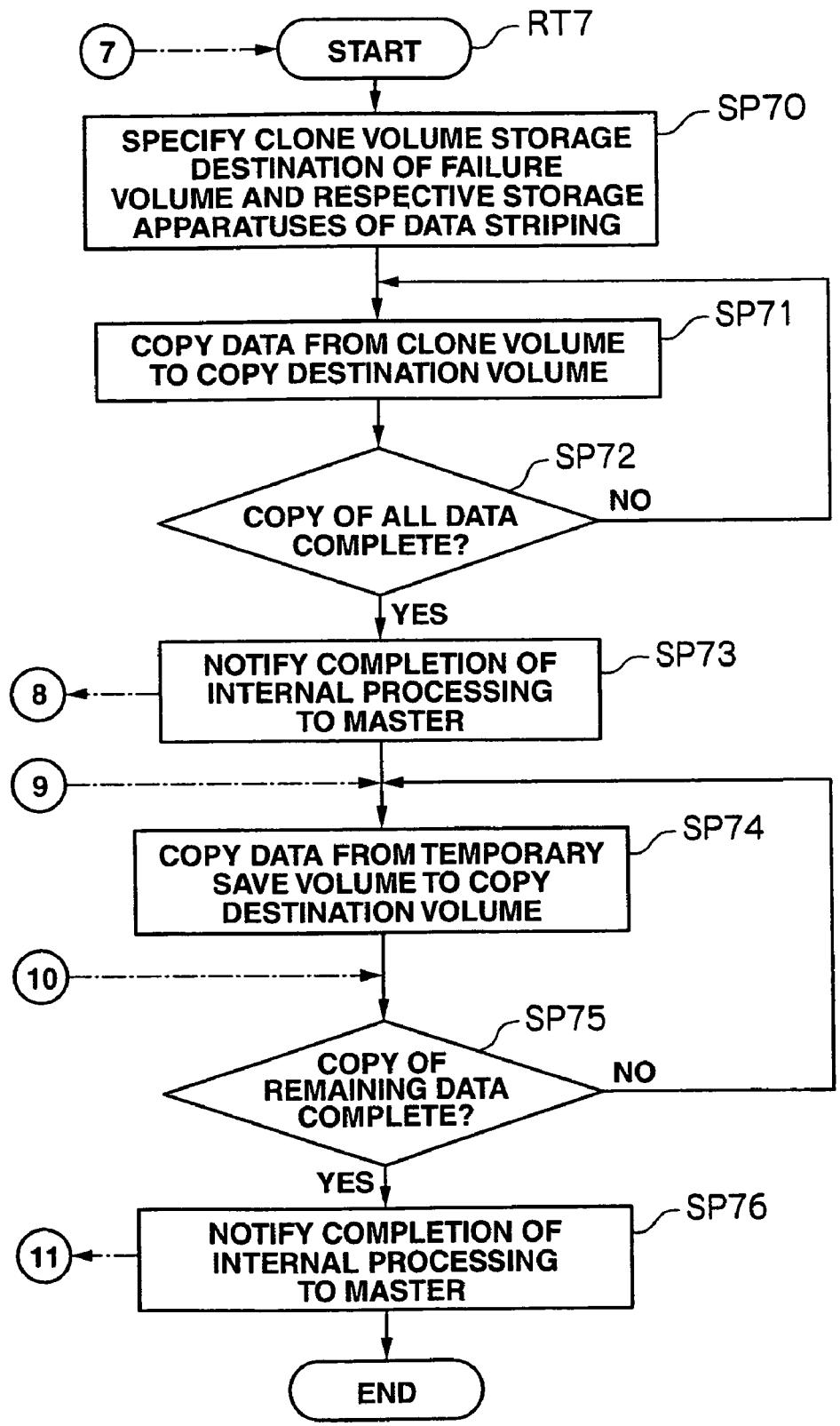
FIG. 17 is a flowchart showing the submaster-side volume recovery processing routine.

Meanwhile, here, the CPU (promoted submaster-side CPU) 21 of the promoted submaster storage apparatus 5, based on the control program stored in the local memory 22 and according to a submaster-side volume recovery processing routine RT7 shown in FIG. 17, executes volume recovery processing for migrating data of the volume VOL provided by the original submaster storage apparatus 5 subject to a failure to the volume VOL of another storage apparatus 5.

In other words, when the promoted submaster-side CPU 21 receives the foregoing volume recovery command transmitted from the master storage apparatus 5 at step SP50 of the master-side volume recovery processing routine RT6 explained with reference to FIG. 15 and FIG. 16, it starts this submaster-side volume recovery processing routine RT7, and foremost specifies, regarding the respective volumes VOL provided by the original submaster storage apparatus 5, the storage apparatus including a volume VOL storing the same data as such volume VOL based on the group configuration information table 80 (FIG. 7) and virtual volume configuration information table 81 (FIG. 8) (SP70).

In actuality, the promoted submaster-side CPU 21, for instance, specifies the storage apparatus 5 providing the corresponding secondary volume when the respective volumes VOL provided by the original submaster storage apparatus 5 are primary volumes, and specifies the storage apparatus 5 providing the corresponding primary volume when the volumes VOL are secondary volumes.

Further, the promoted submaster-side CPU 21 concurrently selects the storage apparatus to become the restoration destination upon restoring the respective volumes VOL provided by the original submaster storage apparatus 5 by distributing them in volume units to the remaining storage apparatuses including the own storage apparatus but excluding the storage apparatus providing the restoration volume based on the group configuration information table 80 (FIG. 7) and virtual volume configuration information table 81 (FIG. 8) (SP70).

Thereupon, the promoted submaster-side CPU 21 selects a storage apparatus 5 that has little effect on the volume recovery processing as the storage apparatus 5 of the distribution destination. For example, when the own storage apparatus is selected as the storage apparatus 5 of the distribution destination, the promoted submaster-side CPU 21 will also have to perform the copy processing of the volume VOL as described later in addition to the recovery processing, and, therefore, the load on the promoted submaster-side CPU 21 will increase, and this will have much impact on the volume recovery processing. Thus, the promoted submaster-side CPU 21 will select the storage apparatus 5 of the distribution destination while avoiding to select the own storage apparatus as much as possible.

Next, the promoted submaster-side CPU 21 controls the corresponding storage apparatus 5 for executing copy processing for copying data from the volume VOL retaining the same data as the volume VOL that was provided by the original submaster storage apparatus 5 specified at step SP70 to the volume VOL provided by the storage apparatus 5 of the distribution destination specified at step SP70 (SP71).

Thereafter, the promoted submaster-side CPU 21 determines whether the copy processing of all necessary data is complete (SP72) and, upon obtaining a negative result, returns to step SP71 and continues the foregoing copy processing. Further, when the copy processing of all necessary data is eventually complete, the promoted submaster-side CPU 21 notifies the completion of internal processing to the master storage apparatus 5 (SP73).

Further, when the promoted submaster-side CPU 21 thereafter receives the metadata transmitted from the master storage apparatus 5 at step SP59 of the master-side recovery processing routine RT6 described with reference to FIG. 15 and FIG. 16, it reads the data to be written and the metadata representing the write position thereof from the foregoing temporary save volume VOL recognized based on such metadata, and writes the data to be written in the corresponding address position of the corresponding volume VOL by controlling the corresponding storage apparatus 5.

Then, the promoted submaster-side CPU 21 thereafter determines whether the copy processing of all data to be written that was saved in the temporary save volume VOL is complete (SP75) and, upon obtaining a negative result, returns to step SP74 and repeats the same processing steps (SP74-SP75-SP74).

Further, when the promoted submaster-side CPU 21 eventually obtains a positive result in the determination at step SP75 as a result of the copy processing at step SP74 being completed, it notifies the completion of internal processing (volume recovery processing) to the master storage apparatus 5 (SP76), and thereafter end this sequential volume recovery processing.

(1-2-2-3-2) Detection Method of Failure in Slave and Recovery Method Thereof

The master storage apparatus 5 or submaster storage apparatus 5 detects a failure in the slave storage apparatus 5. This is because the master storage apparatus 5 and submaster storage apparatus 5 are able to conduct a check upon reading and writing data from and in volume VOL provided by the slave storage apparatus 5.

When the submaster storage apparatus 5 detects a failure in the slave storage apparatus 5, the submaster storage apparatus 5 notifies this to the master storage apparatus 5. Then, the master storage apparatus 5 and submaster storage apparatus 5 executes recovery processing the volume VOL provided by the slave storage apparatus 5 subject to a failure as with the case when a failure in the submaster storage apparatus 5 is detected as described above.

Figure 18:
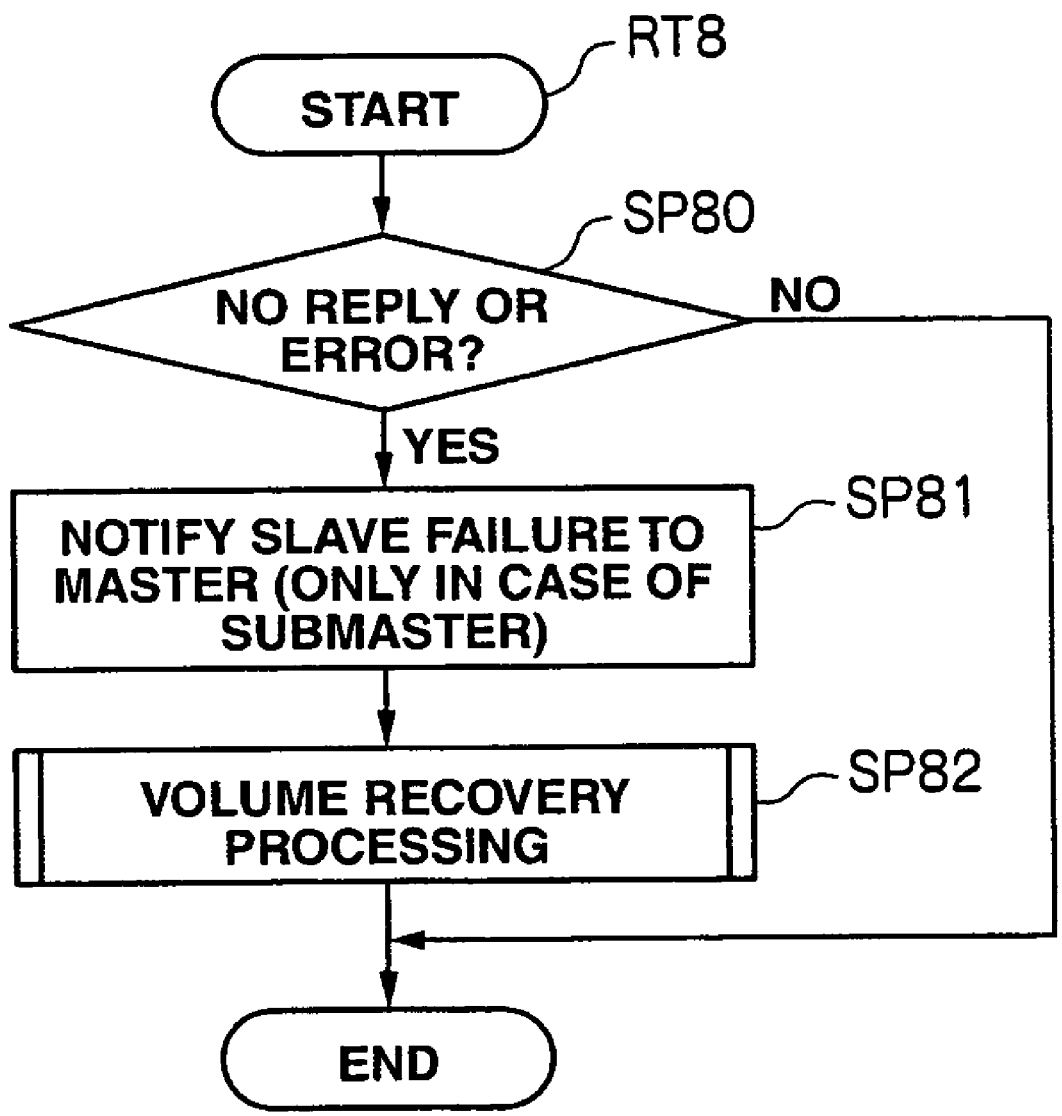
FIG. 18 is a flowchart showing the second failure detection/volume recovery processing routine.

FIG. 18 is a flowchart showing the processing steps of the CPU 21 (master-side CPU 21 or submaster-side CPU 21) of the master storage apparatus 5 and submaster storage apparatus 5 in relation to the failure detection/volume recovery processing of the slave storage apparatus 5. When the master-side CPU 21 or submaster-side CPU 21 issues a data I/O request to the corresponding slave storage apparatus 5 in reply to the data I/O request from the host system 2 or for performing internal processing, based on the control program stored in the local memory 22, it starts the second failure detection/volume recovery processing routine RT8 shown in FIG. 18.

Then, foremost, after transmitting the data I/O request to the slave storage apparatus 5, the master-side CPU 21 or submaster-side CPU 21 determines whether a response has not been received from the slave storage apparatus 5 even after the lapse of a prescribed period, or whether an error notice was given from the slave storage apparatus 5 (SP80).

To obtain a negative result in the foregoing determination means that no failure has occurred in the slave storage apparatus 5, and that the master-side CPU 21 or submaster-side CPU 21 received the completion notice of internal processing from the submaster storage apparatus 5 within a prescribed period from the transmission of such metadata. As a result, here, the master-side CPU 21 or submaster-side CPU 21 ends the failure detection processing performed to the slave storage apparatus 5.

Contrarily, to obtain a positive result in the determination at step SP80 means that a failure has occurred in the slave storage apparatus 5. As a result, when the submaster-side CPU 21 detects this failure, the submaster-side CPU 21 notifies the master storage apparatus 5 that it detected such failure.

Meanwhile, when the master-side CPU 21 detects that a failure has occurred in the slave storage apparatus 5, or when a notice indicating that a failure has occurred in the slave storage apparatus 5 is sent from the submaster-side CPU 21 to the master storage apparatus 5, the master-side CPU 21 executes the master-side volume recovery processing routine RT6 explained with reference to FIG. 15 and FIG. 16. Further, in line with this, the submaster-side CPU 21 also executes the submaster-side volume recovery processing routine RT7 explained with reference to FIG. 17.

Incidentally, in this embodiment, although the master-side CPU 21 temporarily saves the data to be written and the metadata representing the write position thereof in the temporary save volume VOL when a data write request is to the volume VOL provided by the slave storage apparatus 5 subject to a failure is given at step SP51 or step SP60 of the master-side volume recovery processing routine RT6, when both the volume VOL provided by the slave storage apparatus 5 subject to a failure and the volume VOL storing the same data as such volume VOL are not volumes VOL to be subject to internal processing, the target volume VOL may also be updated directly.

Further, the foregoing volume recovery processing may also be performed when the slave storage apparatus 5 is operable but the loss of its redundancy due to a failure is detected.

(1-2-2-3-3) Detection Method of Failure in Master and Recovery Method Thereof

The submaster storage apparatus 5 detects a failure in the master storage apparatus 5. As the means for this, the submaster storage apparatus 5 has a hardware or software internal counter (timer) and, for instance, resets its internal counter upon receiving the metadata transmitted from the master storage apparatus 5 at step SP2 or step SP5 of the master-side data write processing routine RT1 explained with reference to FIG. 10.

Then, the submaster storage apparatus 5 transmits a prescribed inquiry command to the master storage apparatus 5 when a prescribed period lapses from the time the metadata was last received from the master storage apparatus 5.

Here, when there is no abnormality in the master storage apparatus 5 and a reply is provided to the inquiry command, the submaster storage apparatus 5 resets the internal counter, and thereafter enters standby mode and waits to receive metadata from the master storage apparatus 5. Nevertheless, this kind of situation occurs when a data I/O request is not provided from the host system 2 to the master storage apparatus 5 during the foregoing prescribed period. Therefore, in this case, the submaster storage apparatus 5 may configure the time up to the issue of the subsequent inquiry command to be longer than the previously set time.

Meanwhile, when there is no reply from the master storage apparatus 5 in response to the inquiry command within a prescribed period, the submaster storage apparatus 5 is promoted to a master storage apparatus 5, and takes over the network address and data I/O processing of the original master storage apparatus 5 considered to be subject to a failure.

Further, the storage apparatus (this is hereinafter referred to as "promoted master storage apparatus") 5 promoted to a master demotes the storage apparatus 5 with the next lowest priority number after itself to a submaster. Thereupon, the promoted master storage apparatus 5 transfers the metadata that it owns to the storage apparatus (promoted submaster storage apparatus) 5 newly promoted to a submaster as in the case when a failure occurred in the master storage apparatus 5 as described above.

Then, the promoted master storage apparatus 5 thereafter executes volume recovery processing for recovering the volume VOL provided by the original master storage apparatus 5 subject to a failure as in the case when a failure in the submaster is detected as described above.

Figure 19:
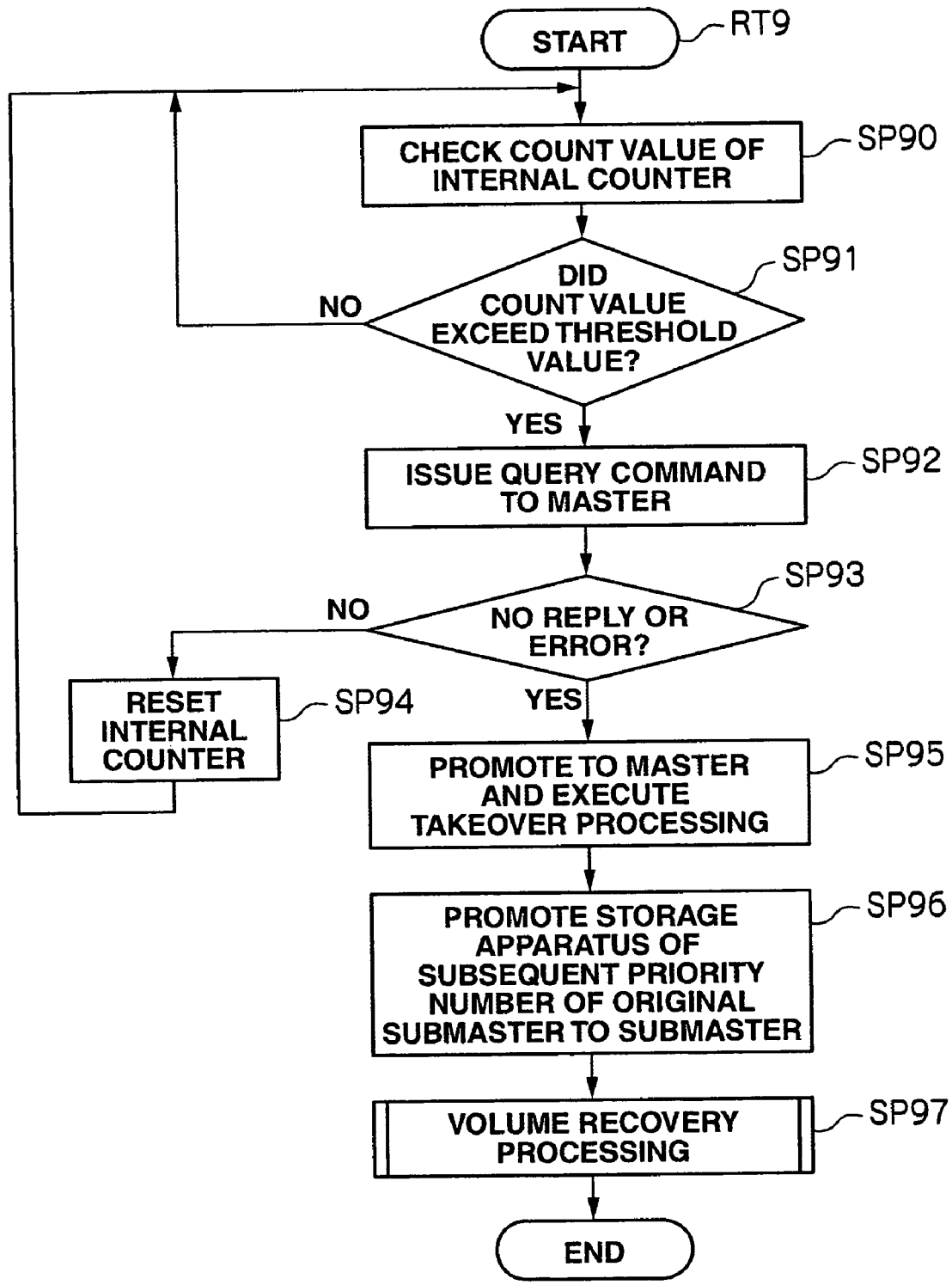
FIG. 19 is a flowchart showing the third failure detection/volume recovery processing routine.
Figure 20:
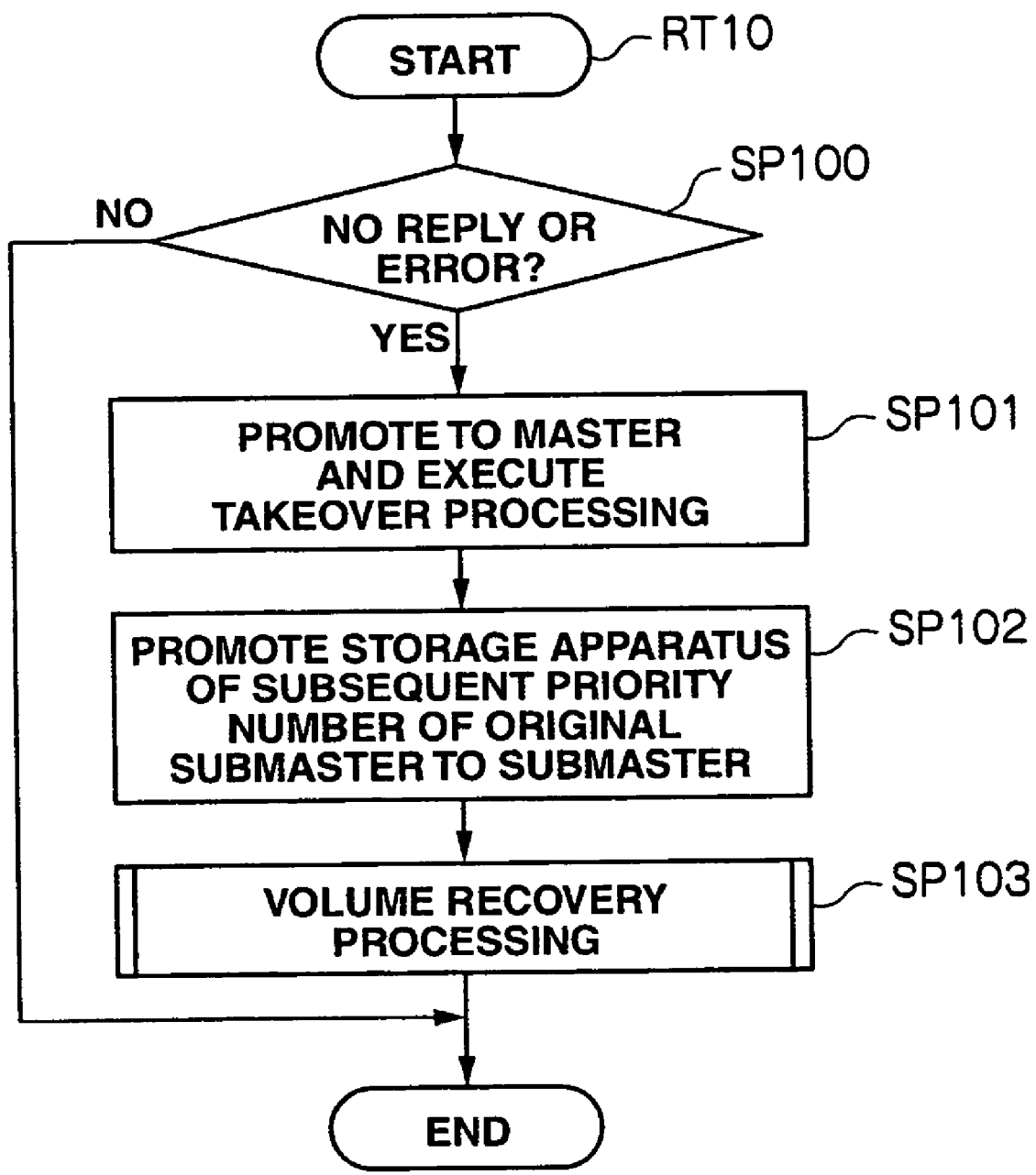
FIG. 20 is a flowchart showing the fourth failure detection/volume recovery processing routine.

FIG. 20 is a flowchart showing the processing steps of the CPU (submaster-side CPU) 21 of the submaster storage apparatus 5 before being promoted to a master in relation to the failure detection/volume recovery processing for detecting a failure in the master storage apparatus 5 based on the metadata transmitted from the master storage apparatus 5 at step SP2 of the master-side data write processing routine RT1 explained with reference to FIG. 10 among the failure detection/volume recovery processing performed to the master storage apparatus 5. The submaster-side CPU 21 detects a failure in the master storage apparatus 5 based on the control program stored in the local memory 22 and according to a third failure detection/volume recovery processing routine RT9 shown in FIG. 19.

In other words, when the submaster-side CPU 21 resets the internal counter pertaining to the rising processing after the power of the own storage apparatus is turned on, it starts this third failure detection/volume recovery processing routine RT9, foremost checks the count value of the internal counter (SP90), and determines whether the count value has exceeded a default threshold value (SP91).

When the submaster-side CPU 21 obtains a negative result in this determination, it continues monitoring the internal counter, and, when such count value exceeds the threshold value, transmits an query command (for instance, a TestUnitReady command) to the master storage apparatus 5 (SP92), and thereafter determines when a reply to this inquiry command has not been given from the master storage apparatus 5 within a prescribed period or an error notice has been given from the master storage apparatus 5 (SP93).

To obtain a negative result in the foregoing determination means that no failure has occurred in the master storage apparatus 5. As a result, the submaster-side CPU 21 resets the internal counter (SP94), and thereafter returns to step SP90 and repeats the same processing steps (SP90 to SP94-SP90).

Contrarily, to obtain a positive result in the determination at step SP93 means that it is highly likely that a failure has occurred in the master storage apparatus 5. As a result, the submaster-side CPU 21 changes the attribute of the own storage apparatus from submaster to master, refers to the group configuration information table 80 (FIG. 7), and executes prescribed takeover processing for taking over the processing of the original master storage apparatus 5 such as for rewriting the network address of the own storage apparatus to the network address of the original master storage apparatus 5 (SP95).

Further, the submaster-side CPU (a promoted master-side CPU at this stage) 21 thereafter promotes the slave storage apparatus 5 given the next highest priority number after the own storage apparatus to a submaster (SP96). Then, the submaster-side CPU (promoted master-side CPU) 21 performs volume recovery processing for recovering the volume VOL provided by the original master storage apparatus 5 in another storage apparatus 5 by executing the volume recovery processing routine RT6 explained with reference to FIG. 15 and FIG. 16 (SP97), and thereafter end this sequential failure detection/volume recovery processing.

Meanwhile, FIG. 20 is a flowchart showing the processing steps of the CPU (submaster-side CPU) 21 of the submaster storage apparatus 5 before being promoted to a master in relation to the failure detection/volume recovery processing for detecting a failure in the master storage apparatus 5 based on the metadata transmitted from the master storage apparatus 5 at step SP5 of the master-side data write processing routine RT1 explained with reference to FIG. 10 among the failure detection/volume recovery processing performed to the master storage apparatus 5.

In other words, when the submaster-side CPU 21 issues a data read request to the master storage apparatus 5 at step SP12 of the submaster-side data write processing routine RT2 explained with reference to FIG. 11, it starts this fourth failure detection/volume recovery processing routine RT10, and foremost determines when a reply to this data read request has not been given from the master storage apparatus 5 within a prescribed period or an error notice has been given from the master storage apparatus 5 (SP100).

To obtain a negative result in the foregoing determination means that no failure has occurred in the master storage apparatus 5. As a result, the submaster-side CPU 21 ends the failure detection/volume recovery processing performed to the master storage apparatus 5.

Contrarily, to obtain a positive result in the determination at step SP100 means that it is highly likely that a failure has occurred in the master storage apparatus 5. As a result, the submaster-side CPU 21 performs step SP101 to step SP103 as with the step SP95 to step SP97 of the third failure detection/volume recovery processing routine RT9 explained with reference to FIG. 19.

Then, the submaster-side CPU 21 thereafter ends the failure detection/volume recovery processing performed to the master storage apparatus 5.

(1-3) Effect of Present Embodiment

As described above, with the storage system according to this embodiment, since the master storage apparatus performs processing of the data I/O request from the host system 2 issued to the storage group, and the submaster storage apparatus performs the other internal processing, the load will not be concentrated on the storage apparatus (master storage apparatus) performing the virtualization processing of the volume provided by the respective storage apparatuses, and it is therefore possible to reply promptly to the data I/O request from the host system even during the execution of high-load internal processing in the storage group.

Figure 21:
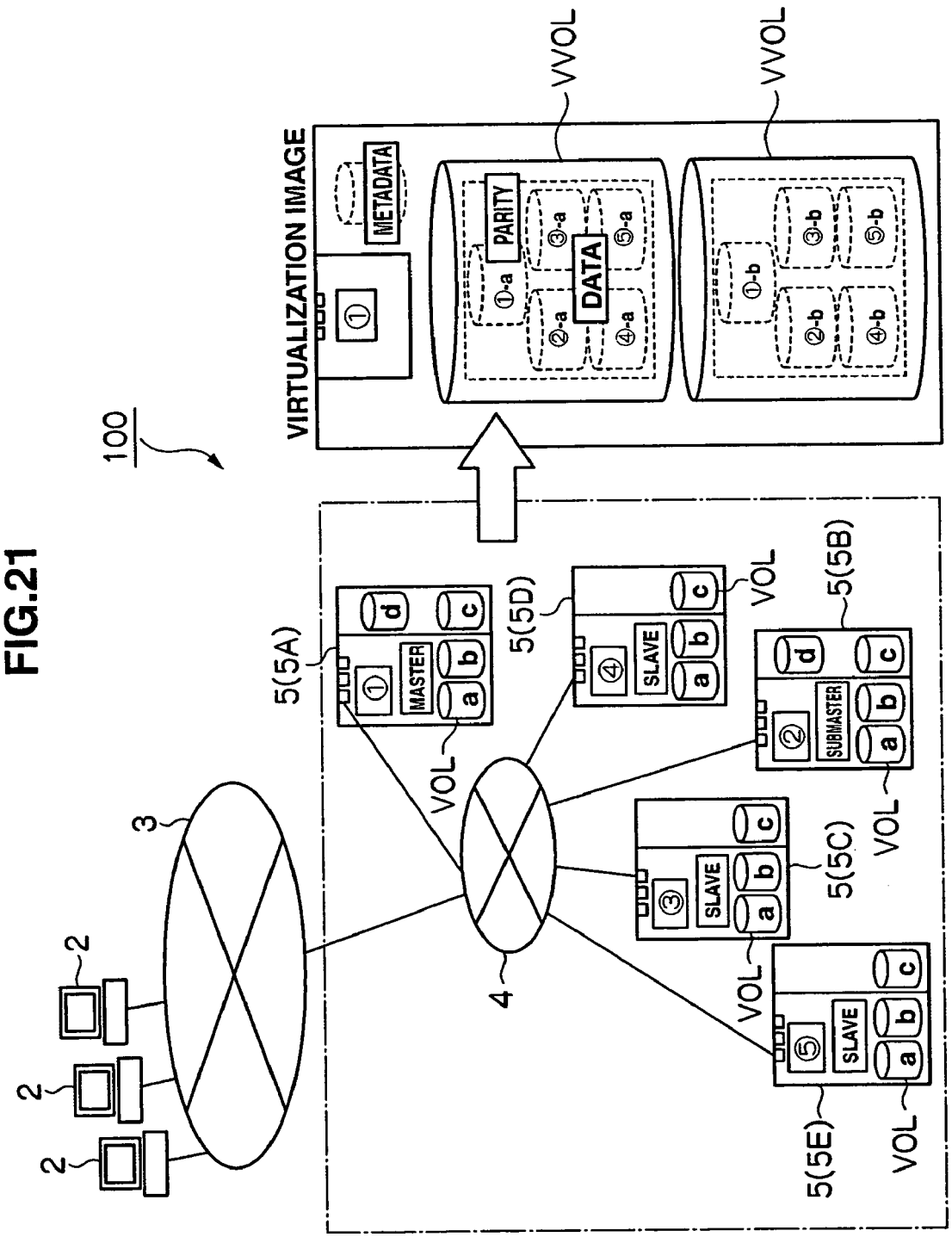
FIG. 21 is a block diagram for explaining the storage system according to the second embodiment.

(2) SECOND EMBODIMENT (2-1) Configuration of Storage System in Present Embodiment FIG. 21 shows a storage system 100 according to the second embodiment. This storage system 100 is configured the same as the storage system 1 according to the first embodiment other than that the backup method of data is an N+1 redundant configuration.

In actuality, with this storage system 100, as shown in FIG. 21, a plurality of volumes VOL among the volumes VOL respectively created in the each of the storage apparatuses 5 in the respective storage groups SG are associated with the respective virtual volume VVOL (in other words, a plurality of volumes VOL are collectively provided to the host system 2 as a single virtual volume VVOL). And, with this storage system 100, the data to be written provided from the host system 2 by designating one of the virtual volumes VVOL is stored according to an N+1 redundant format in a plurality of volumes VOL associated with the virtual volume VVOL. Here, in this embodiment, in order to alleviate the overhead of access, as a general rule, files are stored in the respective volumes VOL without being distributed.

For instance, in the example shown in FIG. 21, the virtual volume VVOL is configured from a volume VOL shown with "a" created in the master storage apparatus 5A shown with "1"; a volume VOL shown with "a" created in the submaster storage apparatus 5B shown with "2"; a volume VOL shown with "a" created in the slave storage apparatus 5C shown with "3"; a volume VOL shown with "a" created in the slave storage apparatus 5D shown with "4"; and a volume VOL shown with "a" created in the slave storage apparatus 5E shown with "5"

Then, when some files are provided by the host system 2 with this virtual volume VVOL as the write destination, the first file data is stored in the volume VOL shown with "a" in the submaster storage apparatus 5B, the subsequent file data is stored in the volume VOL shown with "a" in the slave storage apparatus 5C, and so on, and data will be sequentially stored in file units in the respective volumes VOL. Nevertheless, if the file is so large that it would be better to divide it to improve the performance, such file may be divided.

When the master storage apparatus 5A stores file data in one of the volumes VOL associated with the virtual volume VVOL of the write destination designated with the data write request, it creates a parity based on this file data, and stores this in the volume VOL in the own storage apparatus. Further, metadata of the virtual volume VVOL is duplicated and stored in the master storage apparatus 5A and submaster storage apparatus 5B.

Incidentally, with the storage system 100 according to this embodiment, during normal operation, the submaster storage apparatus 5B executes the same processing as the other slave storage apparatuses 5C to 5E other than performing the failure detection processing of the master storage apparatus 5A, and does not perform any special processing. Nevertheless, when a snapshot volume or the like has been configured, the submaster storage apparatus 5B executes internal processing as with the first embodiment, and also performs recovery processing according to the same procedures as the first embodiment. Nevertheless, data recovery in this case will be restoration based on parity. Like this, in this embodiment, although the load on the master storage apparatus 5A is no different from the normal operation, part of the load of the failure recovery processing is moved to the submaster storage apparatus 5B.

(2-2) Operation Model of Master in Data Write Processing

Next, the processing routine of the CPU (master-side CPU) 21 of the master storage apparatus 5A in relation to the write processing of data in the storage group SG of this embodiment is explained. The master-side CPU 21 executes the following processing based on the control program stored in the local memory 22. Incidentally, in the following explanation, let it be assumed that the write destination of the file data to be written is the virtual volume VVOL in all cases.

When the master-side CPU 21 of this embodiment receives file data A to be written from the host system 2, as shown in FIG. 22 (A-1), it stores this file data A in the first area of the volume VOL provided by any storage apparatus 5 other than the own storage apparatus to the volume (this is hereinafter referred to as a "parity volume") VOL in the own storage apparatus storing the parity. In the example of FIG. 22 (A-1), this shows that the file data A is stored in the first area in the volume VOL of the submaster storage apparatus 5B.

Thereafter, the master-side CPU 21 thereafter writes this file data A in the first area of the parity volume VOL, and updates the metadata representing which data is stored in which area of the virtual volume VVOL. Further, the master-side CPU 21 transfers the backup of the updated metadata to the submaster storage apparatus 5B. Therefore, in the case of FIG. 22 (A-1), as shown in FIG. 22 (A-2), metadata regarding the file data A is retained in the master storage apparatus 5A and submaster storage apparatus 5B, and quantity of distribution is "1".

Next, when the master-side CPU 21 receives file data B to be written from the host system 2, as shown in FIG. 22 (B-1), it stores this file data B in the first area of the volume VOL provided by any storage apparatus 5 other than the parity volume VOL and the volume VOL storing the file data A. In the case of FIG. 22 (B-1), this file data B is stored in the first area in the volume VOL of the slave storage apparatus 5C.

Thereafter, the master-side CPU 21 creates new parity data by calculating the XOR of this file data B and the parity data (file data A in this case) previously stored in the parity volume VOL, and updates the parity data in the parity volume VOL to this new parity data. Further, the master-side CPU 21 thereafter updates the metadata of this virtual volume VVOL according to the write processing of the file data B, and transfers the backup of the updated metadata to the submaster storage apparatus 5B. Therefore, in the case of FIG. 22 (B-1), as shown in FIG. 22 (B-2), the metadata of file data A and file data B is retained by the master storage apparatus 5A and submaster storage apparatus 5B, and the quantity of distribution is "2".

Next, when the master-side CPU 21 receives file data B', which is the update data of file data B, from the host system 2, as shown in FIG. 22 (C-1), it does not store this file data B' in the volume VOL storing the file data B before update, but rather stores this in the first area of the volume VOL provided by any storage apparatus 5 that is not yet storing file data. In the case of FIG. 22 (C-1), this file data B' is stored in the first area of the volume VOL of the slave storage apparatus 5D.

Thereafter, the master-side CPU 21 calculates the XOR of this file data B' and the parity data (XOR of file data A and file data B) previously stored in the parity volume VOL in the cache memory 24 (FIG. 2). Further, the master-side CPU 21 thereafter reads the file data B from the volume VOL storing the file data B before update, and creates new parity data by calculating the XOR of this file data B and the parity data obtained based on the previous parity calculation in the cache memory 24. This parity data is equivalent to the XOR of file data A and file data B'. Then, the master-side CPU 21 updates the parity data written in the parity volume VOL to this parity data.

Further, the master-side CPU 21 thereafter updates the metadata by deleting file data B and adding file data B', and transfers the backup of the updated metadata to the submaster storage apparatus 5B. Therefore, in the case of FIG. 22 (D-1), as shown in FIG. 22 (D-2), the metadata of file data A and file data B' is retained in the master storage apparatus 5A and submaster storage apparatus 5B, and the quantity of distribution is "2".

Thereafter, the master-side CPU 21 repeats the same processing steps, and, as shown in FIG. 22 (E-1) and FIG. 22 (E-2), after storing the file data to all volumes VOL other than the parity volume VOL in the virtual volume VVOL, it advances the pointer to the subsequent area in the respective volumes VOL and repeats the same processing steps.

Operation during failure in the storage system 100 is roughly the same as the first embodiment. Nevertheless, with this storage system 100, the only difference is that the respective volumes VOL in the storage apparatus 5 subject to a failure are recovered based on data in the remaining volumes VOL associated with the virtual volume VVOL which is the same as the respective volumes VOL, and parity data stored in the parity volume VOL. Thereupon, as a result of utilizing the metadata created as described above, it is possible to seek the improvement in access speed and reduction of the volume recovery processing load without having to read unnecessary data.

Further, with this storage system 100, even when a storage apparatus 5 is added inside the storage group SG, for instance, as shown in FIGS. 23(A) and (B), it is possible to deal with the situation by merely storing the subsequently provided new file data in the volume VOL of the added storage apparatus 5. Thus, since the rearrangement of data is not required, it is possible to improve the expansibility and facilitate data management.

Incidentally, with this storage system 100, when the speed up of volume recovery processing is to be given preference during an apparatus_failure, as shown in FIG. 24 (A-1), foremost, it sequentially stores the respective file data A to H provided from the host system 2 while selecting areas in which file data is not written in the corresponding area (area of same row in FIG. 24 (A-1)) of any other volume VOL, and evenly distributing such file data to the respective volumes VOL, and, thereafter, as shown in FIG. 24 (B-1), sequentially stores the respective file data provided from the host system 2 by evenly distributing such file data in the respective volumes VOL.

According to this kind of data storage method, it is possible to suppress the number of storage apparatuses for reading file data necessary in restoring the respective areas of the volume VOL subject to an apparatus failure during the recovery processing of the volume VOL to the number of apparatuses in the same value as the corresponding quantity of distribution shown in FIG. 24 (A-2) and FIG. 24 (B-2).

For example, in the case of FIG. 24 (A-1) and (B-1), at the stage of FIG. 24 (A-1), since the file data stored in a corresponding area of any volume VOL is stored as parity data without change in the respective areas of the parity volume VOL, when a failure occurs in any one of the storage apparatuses 5 of "2" to "5", it is possible to execute volume recovery processing by reading parity data from the storage apparatus 5 of "1".

Further, as shown in FIG. 24 (B-1), when file data A is stored in the first area of the volume VOL of the storage apparatus 5 of "2", and file data I is stored in the first area of the volume VOL of the storage apparatus 5 of "3", even when a failure occurs in any storage apparatus 5 of "1" to "3", it is possible to execute volume recovery processing by reading parity data from the remaining two storage apparatuses 5.

Incidentally, when adopting this kind of data storage method, it is possible to improve the usability of the storage area in the storage system 100 by adjusting the storage position of the file data in accordance with the data size upon writing data or performing migration after the writing of file data so that the data size of the file data to be stored in the corresponding area of the respective volumes VOL will be roughly the same within a certain size range.

(3) THIRD EMBODIMENT

Figure 25:
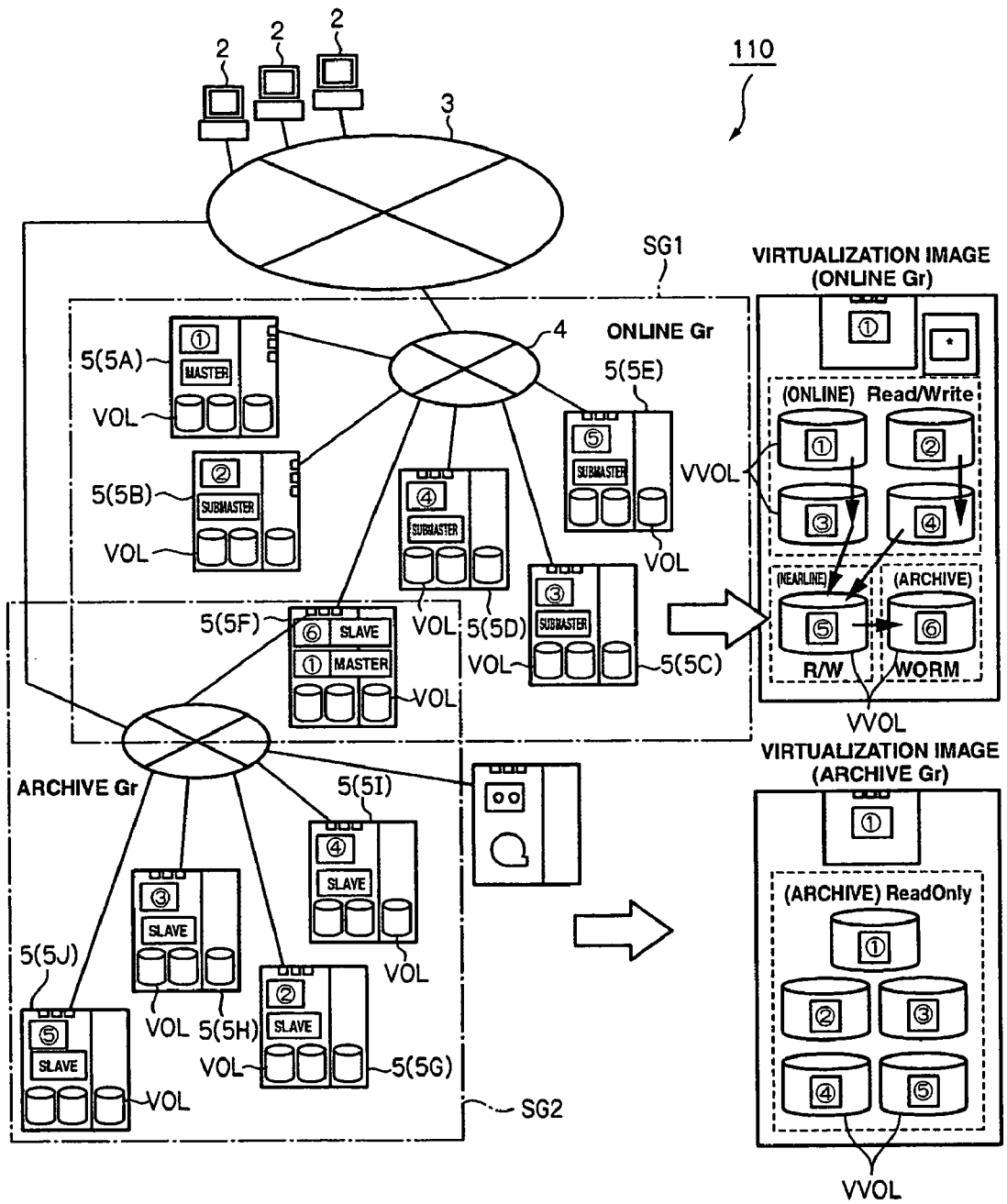
FIG. 25 is a block diagram showing the configuration of a storage system according to the third embodiment.

FIG. 25, which shows the same reference numerals for the same components corresponding to those illustrated in FIG. 1, shows the configuration of a storage system 110 according to the third embodiment. With this storage system 110, the storage apparatus 5 with the lowest priority number in the storage group (this is hereinafter referred to as an "online storage group") SG1 which directly conducts the input and output of data with the host system 2 is also configured as a constituent element of the storage group (this is hereinafter referred to as a "archive storage group") SG2 configured from a plurality of storage apparatuses 5 to be used as an archive.

With the online storage group SG1, excluding the master storage apparatus 5A and the storage apparatus 5F with the lowest priority number, the attribute of all other storage apparatuses 5B to 5E is configured to be a submaster.

The upper part on the right side of FIG. 25 is a virtualization image of the online storage group SG1 to be performed by the master storage apparatus 5A. As shown in FIG. 25, with this online storage group SG1, the respective volumes VOL in the master storage apparatus 5A and the respective volumes VOL in the submaster storage apparatus 5B with the next highest priority number after the master storage apparatus 5 are all configured as primary volumes.

Among the above, the primary volume in the master storage apparatus 5A is associated with a snapshot volume formed from the respective volumes VOL created in the submaster storage apparatus 5C, and the primary volume in the submaster storage apparatus 5B is associated with a snapshot volume formed from the respective volumes VOL created in the submaster storage apparatus 5D.

The submaster storage apparatus 5E is equipped with an inexpensive disk drive such as an LC-FC (LowCost-Fiber-Channel) or serial ATA drive, and a nearline volume VOL is created in the storage area provided by these disk drives 10 (FIG. 2).

The storage apparatus 5 with the lowest priority number in this online storage group SG1 is configured as a slave. And an archive volume VOL of a WORM attribute is formed in this slave storage apparatus 5F.

This slave storage apparatus 5F is configured as a master in the archive storage group SG2. With the archive storage group SG2, all other storage apparatuses 5G to 5J other than the storage apparatus 5F configured as a master in this archive storage group SG2 are configured as a slave.

The lower part on the right side of FIG. 25 is a virtualization image of the archive storage group SG2 to be performed by the master storage apparatus 5F in the archive storage group SG2. As shown in FIG. 25, the archive storage group SG2 has an N+1 redundant configuration as with the storage system 100 in the foregoing second embodiment, and the explanation thereof is omitted since the operation is exactly the same as the storage group SG explained with reference to FIG. 21. Nevertheless, in this embodiment, the respective storage apparatuses 5F to 5J in the archive storage group SG2 are virtualized as a storage apparatus of a read-only attribute in which only the reading of data is permitted to the host system 2.

Next, the processing flow when data to be written is provided from the host system 2 to any primary volume in this storage system 110 is explained.

When data to be written is provided from the host system 2 to any primary volume, the CPU (master-side CPU or submaster-side CPU) 21 of the master storage apparatus 5A or submaster storage apparatus 5B providing such primary volume reads the data stored in the previous address position before writing such data in the address position designated in the primary volume, and transfers this as differential data to the submaster storage apparatuses 5C, 5D providing the snapshot volume associated with this primary volume. Thereafter, the master-side CPU 21 or submaster-side CPU 21 writes the data to be written provided from the host system 2 in the address position designated in the primary volume.

The CPU (submaster-side CPU) 21 of the submaster storage apparatuses 5C, 5D provided with the differential data reads, as with the foregoing master-side CPU 21 or submaster-side CPU 21, the data stored in the previous address position before writing such differential data in the corresponding address position of the snapshot volume, and transfers this as differential backup data to the submaster storage apparatus 5E providing the nearline volume VOL. Thereafter, the submaster-side CPU 21 writes this differential data in the corresponding address position of the snapshot volume.

The CPU (submaster-side CPU) 21 of the submaster storage apparatus 5E provided with the differential backup data migrates the corresponding data to the archive volume 5F as with the submaster-side CPU 21 of the submaster storage apparatuses 5C, 5D providing the foregoing snapshot volume.

And, the data migrated to the archive volume 5F is thereafter stored by being distributed to the volumes VOL created in the respective storage apparatuses 5 (5F to 5J) in the archive storage group SG2 according the same method as the storage group SG (FIG. 21) according to the second embodiment.

Like this, with the storage system 110 according to this embodiment, when data is written from the host system 2 in the primary volume, processing other than the initial data migration in the online storage group SG1 can be assigned to the storage apparatuses 5 (5C to 5F) other than the master storage apparatus 5A providing the primary volume and the submaster storage apparatus 5B.

Next, an application example of eliminating the old storage apparatus 5 in the archive storage group SG2 upon introducing a new storage apparatus 5 in the online storage group SG1 in the storage system 110 having the foregoing configuration is explained.

Figure 26:
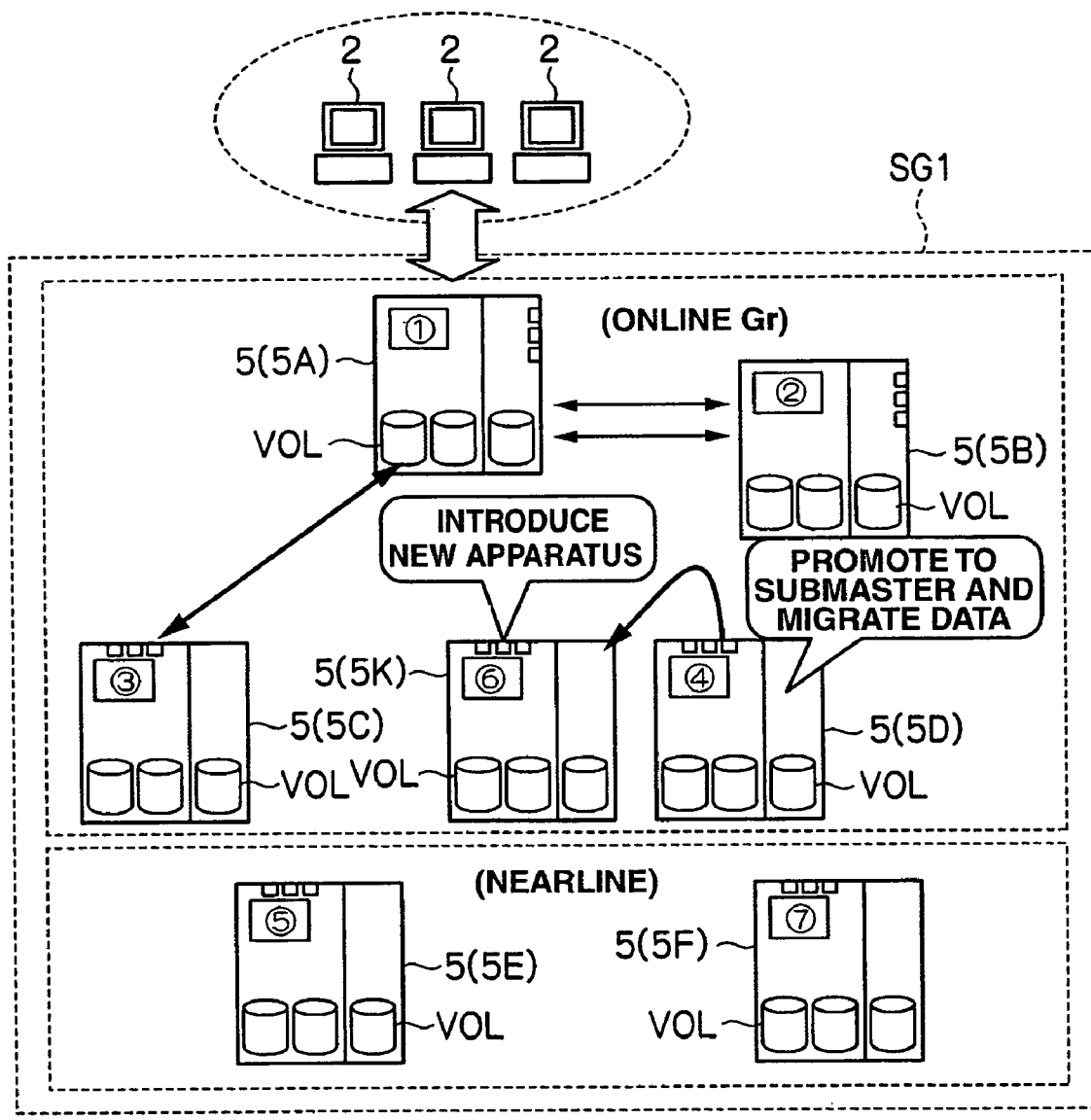
FIG. 26 is a conceptual diagram for explaining an application example.
Figure 27:
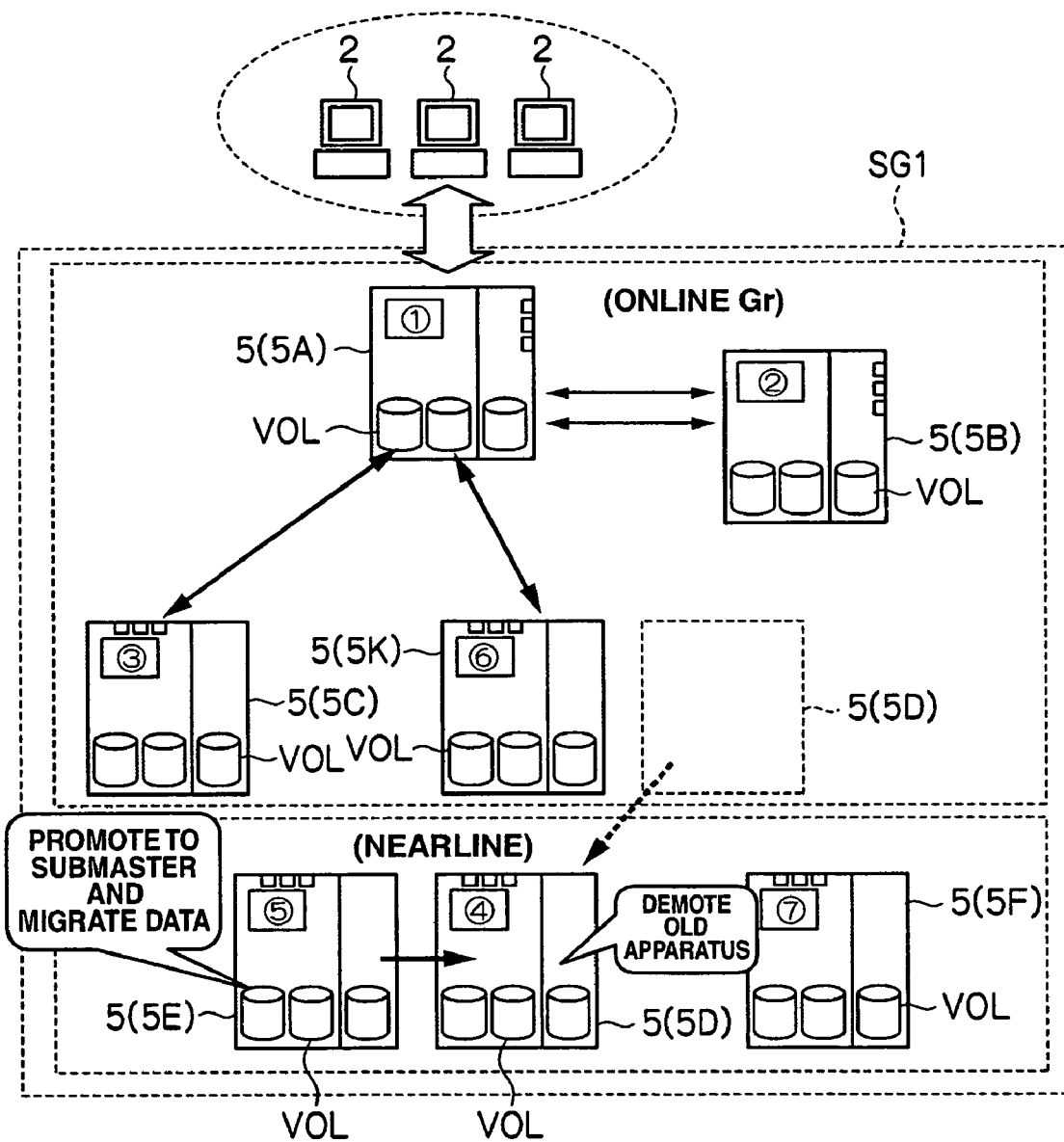
FIG. 27 is a conceptual diagram for explaining an application example.
Figure 28:
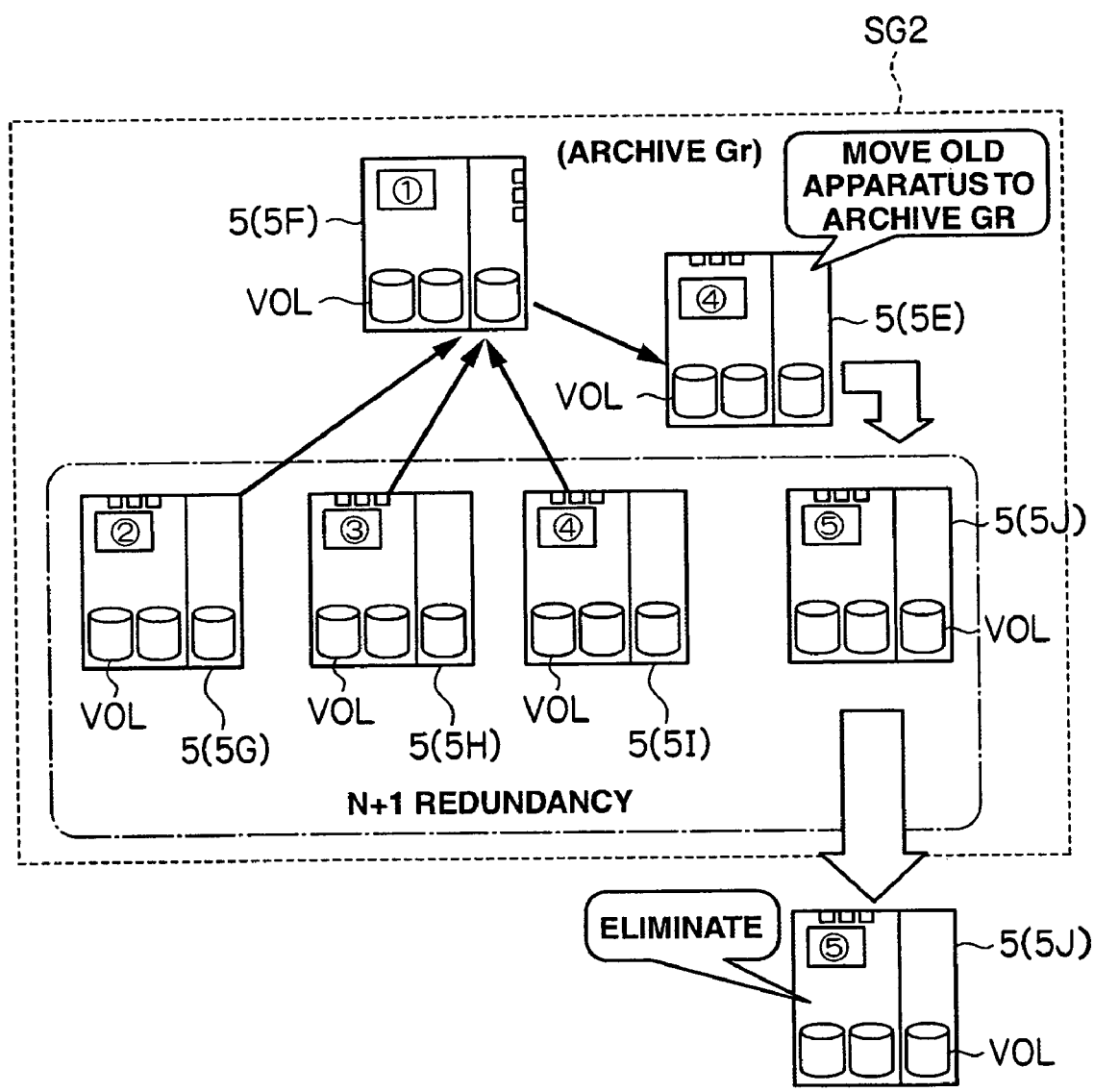
FIG. 28 is a conceptual diagram for explaining an application example.

FIG. 26 to FIG. 28 are diagrams illustrating the flow in this storage system where a new storage apparatus 5K is introduced into the online storage group SG1 by the administrator manually giving instructions of data migration, and the old storage apparatus 5 of the archive storage group SG2 is eliminated pursuant thereto. Incidentally, in this example, let it be assumed that the storage apparatus 5A shown with "1" in the online storage group SG1 is configured as a master, the storage apparatus 5B shown with "2" is configured as a submaster, and the other storage apparatuses 5C to 5F are configured as a slave.

In this case, the administrator operates the maintenance management terminal 26 (FIG. 2) of the master storage apparatus 5A in the online storage group SG1 and promotes a single slave storage apparatus 5D to a submaster. The method of promoting such storage apparatuses 5C, 5D is the same as the method described above, and the storage configuration information table 80 (FIG. 7), in which the slave storage apparatus 5D is configured as a submaster, is transmitted to all storage apparatuses 5B to 5F and 5K in the online storage group SG1.

Then, the administrator thereafter operates the maintenance management terminal 26 (FIG. 2) of the master storage apparatus 5A, and migrates the data of the respective volumes VOL created in the slave storage apparatus 5D promoted to a submaster to the corresponding volume VOL created in the newly introduced storage apparatus 5K.

Next, as shown in FIG. 27, the administrator demotes the storage apparatus 5D promotes to a submaster back down to a slave, and promotes the nearline slave storage apparatus 5E to a submaster. Then, the administrator performs data migration to data from the respective volumes VOL created in the storage apparatus 5E promoted to a submaster to the corresponding volume VOL created in the storage apparatus 5D demoted to a slave.

Thereafter, as shown in FIG. 28, the administrator moves the nearline storage apparatus 5E promoted to a submaster as explained with reference to FIG. 27 to the archive storage group SG2. This move is not physical, and can be realized by controlling the master storage apparatus 5A of the online storage group SG1 to transmit the storage configuration information table 80, in which the storage apparatus 5E has been deleted from the online storage group SG1, to all storage apparatuses 5B to 5F and 5K belong to the online storage group SG1, and operating the master storage apparatus 5F of the archive storage group SG2 to transmit the storage configuration information table 80, in which the storage apparatus 5E has been added to the archive storage group SG2, to all storage apparatuses 5G to 5J belonging to the archive storage group SG2.

Thereafter, the administrator operates the master storage apparatus 5F of the archive storage group SG2 to migrate data of the respective volumes VOL created in the storage apparatus 5J by promoting the storage apparatus 5J to be eliminated to a submaster among the storage apparatuses 5F to 5J belonging to the archive storage group SG2 to the corresponding volume VOL created in the storage apparatus 5E which was moved from the online storage group SG1 to the archive storage group SG2. Thereby, it is possible to thereafter eliminate the storage apparatus 5J to be eliminated. Although the foregoing processing steps are performed by the management terminal in the storage apparatus 5, the foregoing sequential processing steps may be script and automated with a remote maintenance terminal similar to the host system 2.

As described above, with the storage system 110 according to this embodiment, introduction of a new storage apparatus 5 or elimination of an old storage apparatus 5 is facilitated. Therefore, it is possible to easily take measures for preventing the loss of data caused by deterioration in reliability with age.

Further, with the storage system 110 according to this embodiment, data change is minimal, overhead will not be a problem even when the master storage apparatus 5F of the archive storage group SG2 creates parity data.

Moreover, with the storage system 110 according to this embodiment, although an explanation was provided simply regarding the data migration based on copy-on-write of the snapshot operation, the same operation can be realized by configuring a migration policy in each data and performing data migration based on such policy. Further, depending on the situation, the nearline virtual volume VOL in the online storage group SG1 may adopt the N+1 redundant configuration to achieve improved cost effectiveness.

(4) OTHER EMBODIMENTS

Incidentally, in the foregoing embodiments, as described with reference to FIG. 7 to FIG. 9, although a case was explained where information such as "priority", "attribute information" and "status" was adopted as management information per storage apparatus 5 of the respective storage apparatuses configured in the same storage group SG, and "Group identifying information" and "apparatus parameter" were adopted as management information regarding the overall storage group SG, the present invention is not limited thereto, and various types of other information may be adopted as management information per storage apparatus 5 or management information of the overall storage group SG.

Further, in the foregoing embodiments, although a case was explained of applying the present invention to the storage systems 1, 100, 110 configured as illustrated in FIG. 1 or FIG. 25, or the storage apparatus 5 configured as illustrated in FIG. 2, the present invention is not limited thereto, and may also be widely applied to storage systems and storage apparatuses having various other configurations.

The present invention can be applied to a storage system having a plurality of storage apparatuses and a storage apparatus having various types of configurations.

We claim:

1. A storage system in which a plurality of storage apparatuses are connected to a network and configured into a plurality of storage groups,
    wherein each of the storage apparatuses has a processor, a memory, a channel interface and a disk interface,
    wherein each storage apparatus belongs to at least one of the storage groups, retains in the memory thereof configuration information of each of storage apparatuses in said at least one storage group, a priority number representing a priority of said each storage apparatus in each of said at least one storage group to become a substitute master when a failure occurs in a master storage apparatus in said each storage group, and management information of said at least one storage group, said configuration information and management information are common among all of said storage apparatuses configured in the same storage group,
    wherein a first storage apparatus with the highest priority number in said each storage group is configured as said master storage apparatus whose processor performs virtualization processing of storage apparatuses in said each storage group by presenting said storage apparatuses in said each storage group as a single virtual storage apparatus to a host system, presenting volumes configured in memories of said respective storage apparatuses in said each storage group as at least primary and secondary virtual volumes of the single virtual storage apparatus to the host system, receiving data I/O processing requests designating said virtual volumes sent from the host system, and performing data I/O processing for a received data I/O processing request from the host system to said virtual storage apparatus which involves a volume configured in the memory of said master storage apparatus for data reading and writing requested by the host system,
    wherein a second highest priority number is given to another one of the storage apparatuses in said storage group to become the substitute master when a failure occurs in the master storage apparatus, the priority numbers are either continuous or non-continuous integer numbers, and some of the priority numbers are shared by two or more of the storage apparatuses in said storage group, and
    wherein a storage apparatus with the lowest priority number in an on-line storage group which directly conducts data input and output with the host system is also configured as a master storage apparatus in an archive storage group used as an archive of the on-line storage group.

2. The storage system according to claim 1, wherein said storage apparatus other than said first storage apparatus in said storage group does not reply that it is an operable storage apparatus to a discovery request from said host system.

3. The storage system according to claim 2, wherein said each storage apparatus belongs to the same storage group does not reply that it is an operable storage apparatus to a discovery request from another storage apparatus in the storage group with a priority in said storage group that is equal to or higher than said each storage apparatus.

4. The storage system according to claim 1, wherein a volume in said each storage apparatus virtualized by said first storage apparatus is disposed redundantly in said plurality of storage apparatuses configuring said same storage group.

5. The storage system according to claim 4, wherein, when the access from said host system is a data I/O request of files in said each storage apparatus virtualized in said storage group, the number of said storage apparatuses retaining metadata of said virtual volume is less than the number of said storage apparatuses configuring said virtual volume.

6. The storage system according to claim 1, wherein said second storage apparatus performs said data migration involving internal processing according to instructions from said first storage apparatus; and
    wherein said first storage apparatus transmits prescribed metadata to said second storage apparatus upon designating said internal processing to said second storage apparatus.

7. The storage system according to claim 6, wherein said second storage apparatus makes an inquiry to said first storage apparatus if it does not receive said metadata set to be transmitted from said first storage apparatus for over a certain period of time.

8. The storage system according to claim 1, wherein, when a failure occurs in said first storage apparatus or said second storage apparatus in said storage group, said storage apparatus with the next highest priority after said first storage apparatus or said second storage apparatus subject to said failure takes over the functions of said first storage apparatus or said second storage apparatus subject to said failure, based on said priority information of each of said storage apparatuses.

9. The storage system according to claim 1, wherein, when said each storage apparatus is configured to belong to a plurality of said storage groups, said each storage apparatus retains, per storage group, configuration information and priority information of each of said storage apparatuses configured in a respective one of said storage groups and management information of the respective storage group.

10. The storage system according to claim 9, wherein configuration information and priority information of each of said storage apparatuses configured in said respective storage group and management information of the respective storage group are configured to have different characteristics in each of said storage groups among said storage groups.

11. The storage system according to claim 9, wherein a storage apparatus in an online storage group which directly conducts the input and output of data with the host system is also configured as a constituent element of an archive storage group to be used as an archive.

12. The storage system according to claim 11, wherein said storage apparatus in the online storage group has the lowest priority number in the online storage group.

13. The storage system according to claim 11, wherein said storage apparatus is configured as a slave in the online storage group, and as a master in archive storage group for performing virtualization processing of said storage apparatuses in said archive storage group to present said storage apparatuses in said archive storage group as a single virtual storage apparatus to the host system.

14. The storage system according to claim 11, wherein said storage apparatus has different priority numbers and/or different identifiers in the online storage group and in archive storage group respectively.

15. The storage system according to claim 11, wherein said storage apparatuses in said archive storage group are configured as read only.

16. The storage system according to claim 1, wherein internal processings other than said virtualization processing of the storage apparatuses are performed with a second one of said storage apparatuses in said each storage group, and said second storage apparatus is configured to perform snapshots, mirroring or data migration involving internal processings on the remaining storage apparatuses in said storage group.

17. The storage system according to claim 16, wherein the remaining storage apparatuses in said each storage group are set as slave storage apparatuses, and the configuration information includes different QoS (Quality of Service) parameters set regarding a status as a master, submaster or slave.

18. The storage system according to claim 1, wherein each storage apparatus retains in the memory thereof a storage group identifier each identifying one of said at least one storage group.

19. The storage system according to claim 1, wherein each storage apparatus replies itself as an operable storage apparatus only to a discovery request from a storage apparatus having a priority number that is equal or higher than a priority number of its own, and does not reply to a discovery request issued from the host system.

20. A data processing method of a storage system in which a plurality of storage apparatuses are connected to a network, each of said storage apparatuses having a processor, a memory, a channel interface and a disk interface, said method comprising:
configuring said storage apparatuses into a plurality of storage groups, each of said storage apparatuses belonging to at least one of the storage groups;
storing in each of said storage apparatuses management information per storage apparatus of each of said storage apparatuses configured in the same storage group, and group configuration information formed from management information relating to the storage group, a priority number representing a priority of said each storage apparatus in the storage group to become a substitute master when a failure occurs in a master storage apparatus in the storage group, and management information of the storage group, said configuration information and management information are common among all of said storage apparatuses configured in the same storage group;
configuring a first storage apparatus with the highest priority in said storage group as said master storage apparatus whose processor performs virtualization processing of storage apparatuses in the storage group, by presenting said storage apparatuses in said each storage group as a single virtual storage apparatus to a host system, presenting volumes configured in memories of said respective storage apparatuses in said each storage group as at least primary and secondary virtual volumes of the single virtual storage apparatus to the host system, receiving data I/O processing requests designating said virtual volumes sent from the host system, and performing data I/O processing for a received data I/O request from the host system to said virtual storage apparatus which involves a volume configured in the memory of said master storage apparatus for data reading and writing requested by the host system;
giving a second highest priority number to another one of the storage apparatuses in said storage group to become the substitute master when a failure occurs in the master storage apparatus, the priority numbers being either continuous or non-continuous integer numbers, and some of the priority numbers being shared by two or more of the storage apparatuses in said storage group, and
configuring a storage apparatus with the lowest priority number in an on-line storage group which directly conducts data input and output with the host system also as a master storage apparatus in an archive storage group used as an archive of the on-line storage group.

21. The data processing method according to claim 20, wherein said second storage apparatus is given a priority that is next highest after said first storage apparatus.

22. The data processing method according to claim 21, further comprising when a failure occurs in said first storage apparatus or said second storage apparatus in said same storage group, taking over by a storage apparatus with the next highest priority after said first storage apparatus or said second storage apparatus subject to the failure said virtualization processing and said data I/O processing of said first storage apparatus, or said internal processing of said second storage apparatus subject to said failure.

* * * * *